Feb. 25, 1964 H. C. HANSEN 3,122,370

AUTOMATIC PHONOGRAPHS

Filed Oct. 15, 1958 18 Sheets-Sheet 1

INVENTOR.
HANS CHRISTIAN HANSEN
BY Dicke + Craig
ATTORNEYS

Feb. 25, 1964 H. C. HANSEN 3,122,370

AUTOMATIC PHONOGRAPHS

Filed Oct. 15, 1958 18 Sheets-Sheet 2

Inventor

HANS CHRISTIAN HANSEN

By Dicke & Craig

Attorneys

Feb. 25, 1964 | H. C. HANSEN | 3,122,370

AUTOMATIC PHONOGRAPHS

Filed Oct. 15, 1958 | 18 Sheets-Sheet 3

Inventor
HANS CHRISTIAN HANSEN

By Dicke & Craig
Attorneys

Feb. 25, 1964

H. C. HANSEN 3,122,370

AUTOMATIC PHONOGRAPHS

Filed Oct. 15, 1958

18 Sheets-Sheet 4

Inventor
HANS CHRISTIAN HANSEN

By Dicke & Craig

Attorneys

Feb. 25, 1964 H. C. HANSEN 3,122,370

AUTOMATIC PHONOGRAPHS

Filed Oct. 15, 1958 18 Sheets-Sheet 5

Inventor

HANS CHRISTIAN HANSEN

By Dicke + Craig

Attorneys

Feb. 25, 1964 H. C. HANSEN 3,122,370

AUTOMATIC PHONOGRAPHS

Filed Oct. 15, 1958 18 Sheets-Sheet 6

Inventor
HANS CHRISTIAN HANSEN

By Dicke & Craig
Attorneys

Feb. 25, 1964 H. C. HANSEN 3,122,370

AUTOMATIC PHONOGRAPHS

Filed Oct. 15, 1958 18 Sheets-Sheet 7

Inventor
HANS CHRISTIAN HANSEN

By Dicke + Craig
Attorneys

Feb. 25, 1964    H. C. HANSEN    3,122,370

AUTOMATIC PHONOGRAPHS

Filed Oct. 15, 1958    18 Sheets-Sheet 8

INVENTOR.

HANS CHRISTIAN HANSEN

BY Dicke + Craig

ATTORNEYS

Inventor
HANS CHRISTIAN HANSEN

By Dicke + Craig
Attorneys

Feb. 25, 1964 H. C. HANSEN 3,122,370

AUTOMATIC PHONOGRAPHS

Filed Oct. 15, 1958

18 Sheets-Sheet 10

INVENTOR.
HANS CHRISTIAN HANSEN

BY Dicke + Craig

ATTORNEYS

Feb. 25, 1964 H. C. HANSEN 3,122,370

AUTOMATIC PHONOGRAPHS

Filed Oct. 15, 1958 18 Sheets-Sheet 11

INVENTOR.
HANS CHRISTIAN HANSEN
BY Dicke + Craig
ATTORNEYS

Feb. 25, 1964 H. C. HANSEN 3,122,370

AUTOMATIC PHONOGRAPHS

Filed Oct. 15, 1958 18 Sheets-Sheet 12

INVENTOR.

HANS CHRISTIAN HANSEN

BY Dicke + Craig

ATTORNEYS

Feb. 25, 1964 H. C. HANSEN 3,122,370

AUTOMATIC PHONOGRAPHS

Filed Oct. 15, 1958 18 Sheets-Sheet 13

Inventor
HANS CHRISTIAN HANSEN

By Dicke + Craig
Attorneys

Feb. 25, 1964 H. C. HANSEN 3,122,370

AUTOMATIC PHONOGRAPHS

Filed Oct. 15, 1958 18 Sheets-Sheet 14

Inventor

HANS CHRISTIAN HANSEN

By Dicke + Craig

Attorneys

Feb. 25, 1964 H. C. HANSEN 3,122,370

AUTOMATIC PHONOGRAPHS

Filed Oct. 15, 1958 18 Sheets-Sheet 15

Inventor

HANS CHRISTIAN HANSEN

By Dicke & Craig

Attorneys

Feb. 25, 1964 H. C. HANSEN 3,122,370

AUTOMATIC PHONOGRAPHS

Filed Oct. 15, 1958 18 Sheets-Sheet 16

Inventor
HANS CHRISTIAN HANSEN

By Dicke + Craig
Attorneys

Feb. 25, 1964 H. C. HANSEN 3,122,370

AUTOMATIC PHONOGRAPHS

Filed Oct. 15, 1958 18 Sheets-Sheet 17

Inventor
HANS CHRISTIAN HANSEN

By Dicke & Craig
Attorneys

Feb. 25, 1964 H. C. HANSEN 3,122,370

AUTOMATIC PHONOGRAPHS

Filed Oct. 15, 1958 18 Sheets-Sheet 18

Inventor
HANS CHRISTIAN HANSEN

By Dicke + Craig
Attorneys

United States Patent Office 3,122,370

Patented Feb. 25, 1964

3,122,370

AUTOMATIC PHONOGRAPHS

Hans Christian Hansen, 14 Christiansholmsvej, Klampenborg, Copenhagen, Denmark

Filed Oct. 15, 1958, Ser. No. 767,412
Claims priority, application Great Britain Oct. 23, 1957
41 Claims. (Cl. 274—10)

Figure 1:
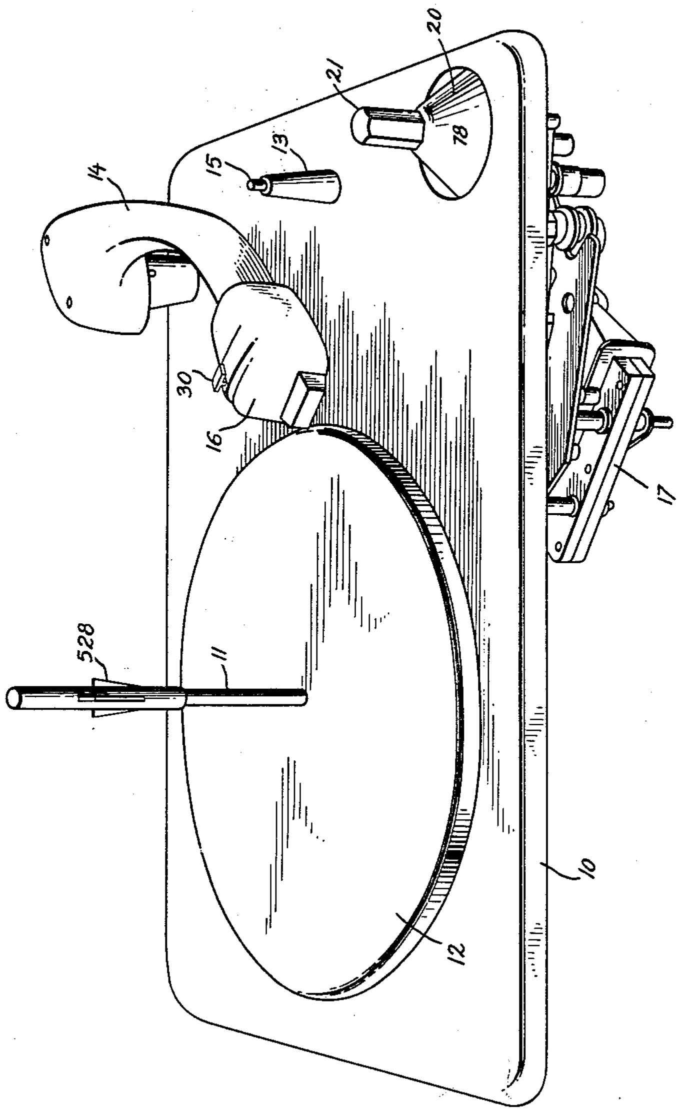

This is a continuation-in-part of my application Serial Number 425,949, filed April 27, 1954, now U.S. Patent No. 2,989,313.

The invention relates to phonographic apparatus having an indexing device or a trackfinder mechanism.

The term indexing device or trackfinder mechanism as used here and in the following specification shall be understood to mean a mechanism operable to support the tone arm on the top surface of a record which is supported in a playing position such as on the turntable of the phonograph with the stylus tip spaced above the record surface during movement of the tone arm across the surface of the record to the edge thereof where the indexing device or trackfinder arrangement is released to a retracted position above the stylus tip in order to deposit the latter on the record to initiate playing of the record.

It is an object of the invention to provide a phonograph having an indexing device or trackfinder mechanism of the type defined hereinabove in which the velocity of the tone arm across the surface of the record to the edge thereof can be controlled by a member of a control mechanism which controls the movement of the tone arm during the cycle between playing of records.

Another object of the invention is to provide a phonograph having a cycling cam operable to control movements of the tone arm from an end-of-play position to a start-of-play position by means of a suitable lever arrangement and in which an indexing device or trackfinder mechanism is operable to feel the size of the next record to be played and in which release of the trackfinder mechanism at the edge of the record causes disengagement between the cycling cam and the lever system.

Still another object of the invention is to provide a phonograph having a cycle control mechanism operable to move the tone arm during the time interval between playing of records and an indexing device or trackfinder mechanism operable to feel the size of the next record to be played in a position resting on the turntable of the phonograph and to be released adjacent the edge of the record so as to deposit the tone arm stylus in the initial sound groove of the record in which the cycle mechanism includes a driving member and a driven member, the latter being connected with the tone arm and engageable from the driving member so as to be allowed to swing freely following the swinging movement of the tone arm when the stylus passes in the sound groove of the record and in which said disengagement is controlled by means of the trackfinder mechanism.

Still a further object of the invention is to provide a phonograph having a trackfinder arrangement or indexing device operable to feel the size of the next record by supporting the tone arm with its stylus spaced above the surface of a record resting on the phonograph turntable and operable to be released adjacent the edge of the phonograph record for depositing the stylus tip in the initial sound groove of the record in which a cycling cam is provided for moving the tone arm to cause the tone arm to be eventually lowered on a record supported on the phonograph turntable with the trackfinder arrangement in operative position and in which selector means are provided for activating the trackfinder arrangement to assume its operative position and simultaneously render the cycling cam arrangement effective to control the tone arm movement as hereinbefore mentioned.

Still a further object of the invention is to provide a phonograph having a trackfinder arrangement as hereinbefore specified, one cycling cam arrangement for controlling movements of the tone arm to a position eventually causing the tone arm to be lowered on the top side of a record to render the trackfinder arrangement operable to perform its function, i.e. feeling the size of a record, and a second cycling cam arrangement operable to render the stop arrangement effective to eventually stop the phonograph and in which selector means are provided for rendering the first cycling cam arrangement effective in the case of a record in a magazine stack and alternatively rendering the second cycling cam arrangement effective in the absence of a record in said magazine stack.

Still a further object of the invention is to provide a phonograph having a trackfinder arrangement as hereinbefore specified, a support for a stack of records vertically spaced above the record turntable and means for simultaneously rendering said trackfinder arrangement operative to feel the size of a record supported on the turntable and deposit the stylus tip in the initial stylus groove of said record and rendering a cycling cam means effective for moving the tone arm through a path to eventually deposit the tone arm with a member of the trackfinder arrangement in engagement with the record surface.

Figure 2:
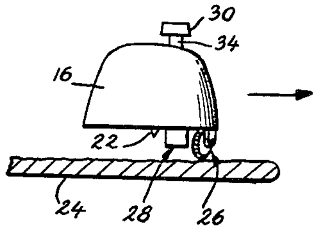
Figure 3:
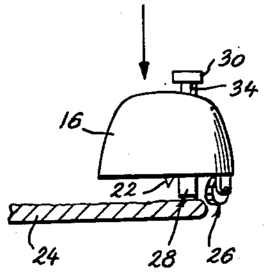
Figure 4:
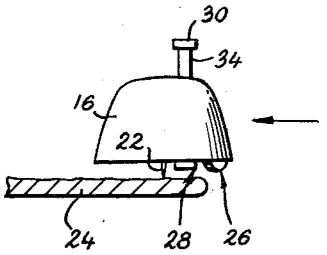
Figure 7:
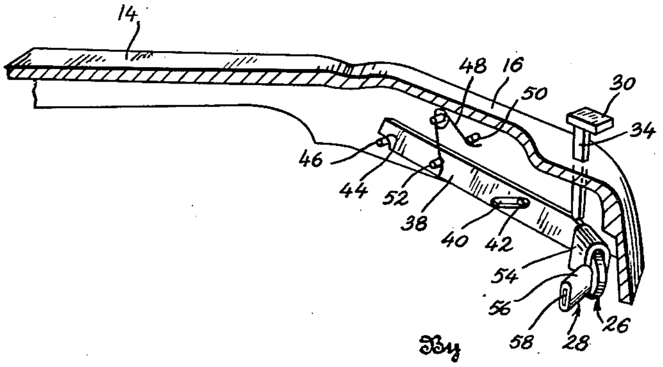
Figure 5:
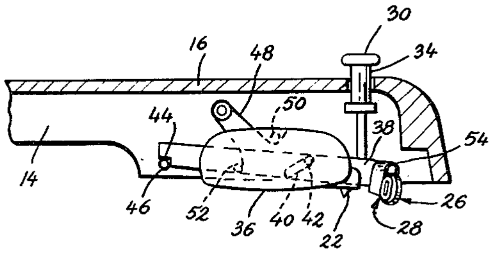
Figure 6:
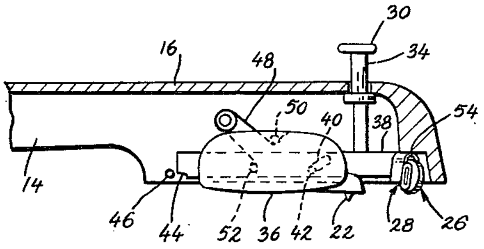
Figure 8:
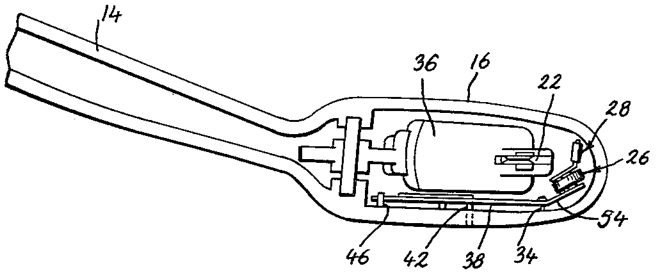
Figure 9:
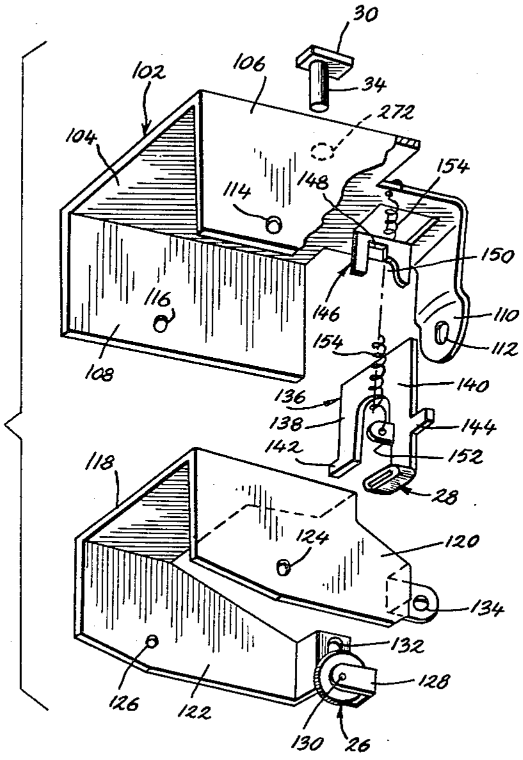
Figure 10:
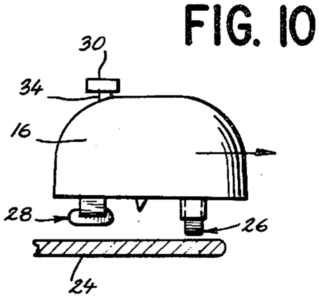
Figure 11:
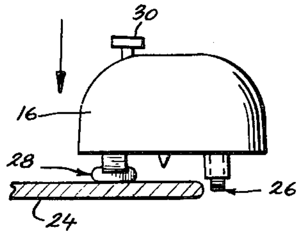
Figure 12:
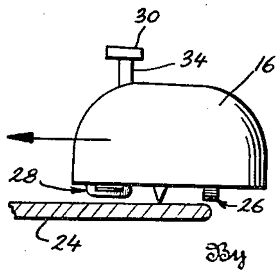
Figure 13:
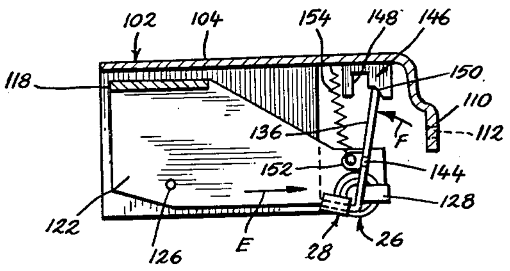
Figure 14:
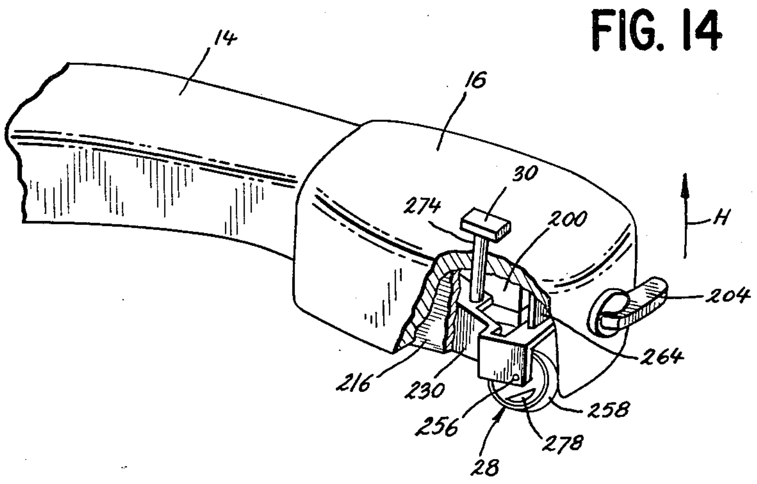
Figure 15:
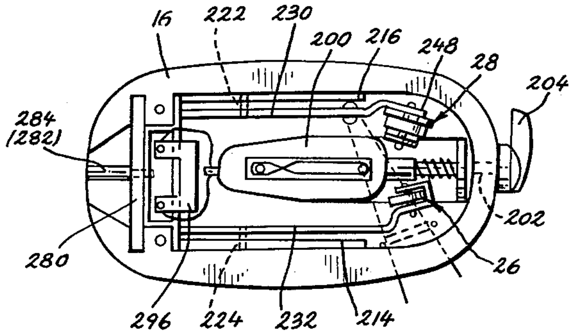
Figure 16:
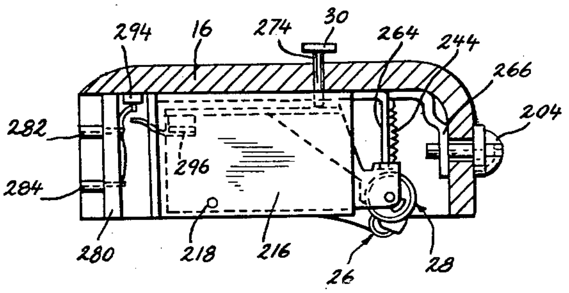
Figure 17:
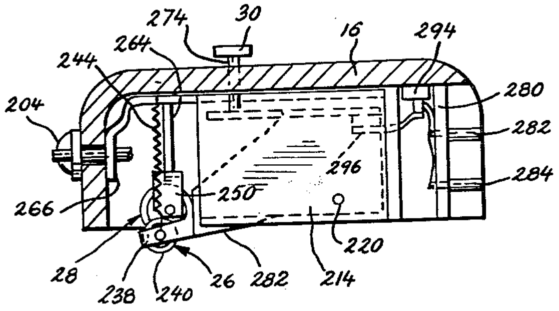
Figure 18:
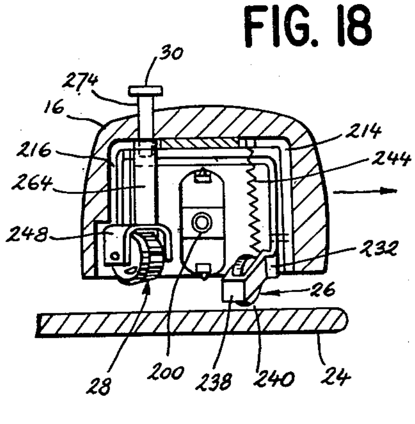
Figure 20:
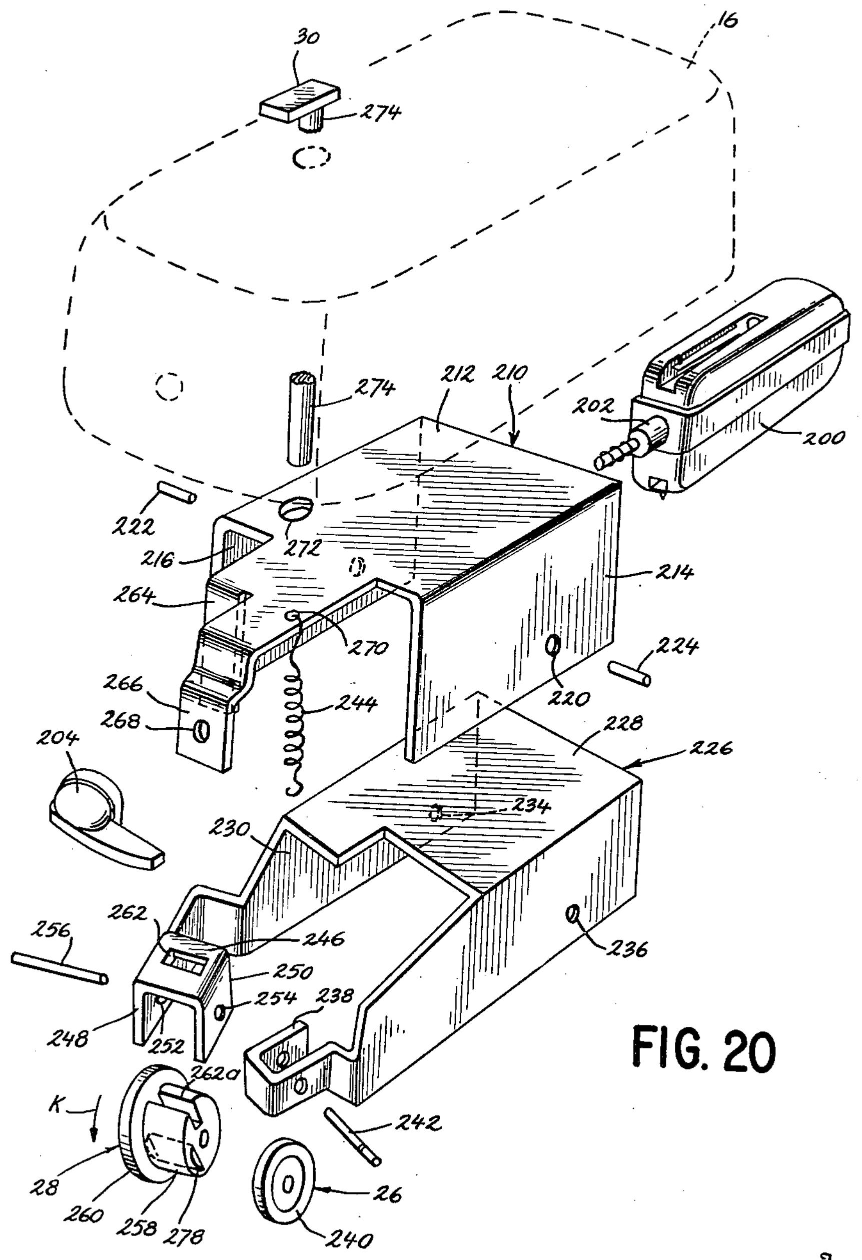
Figure 21:
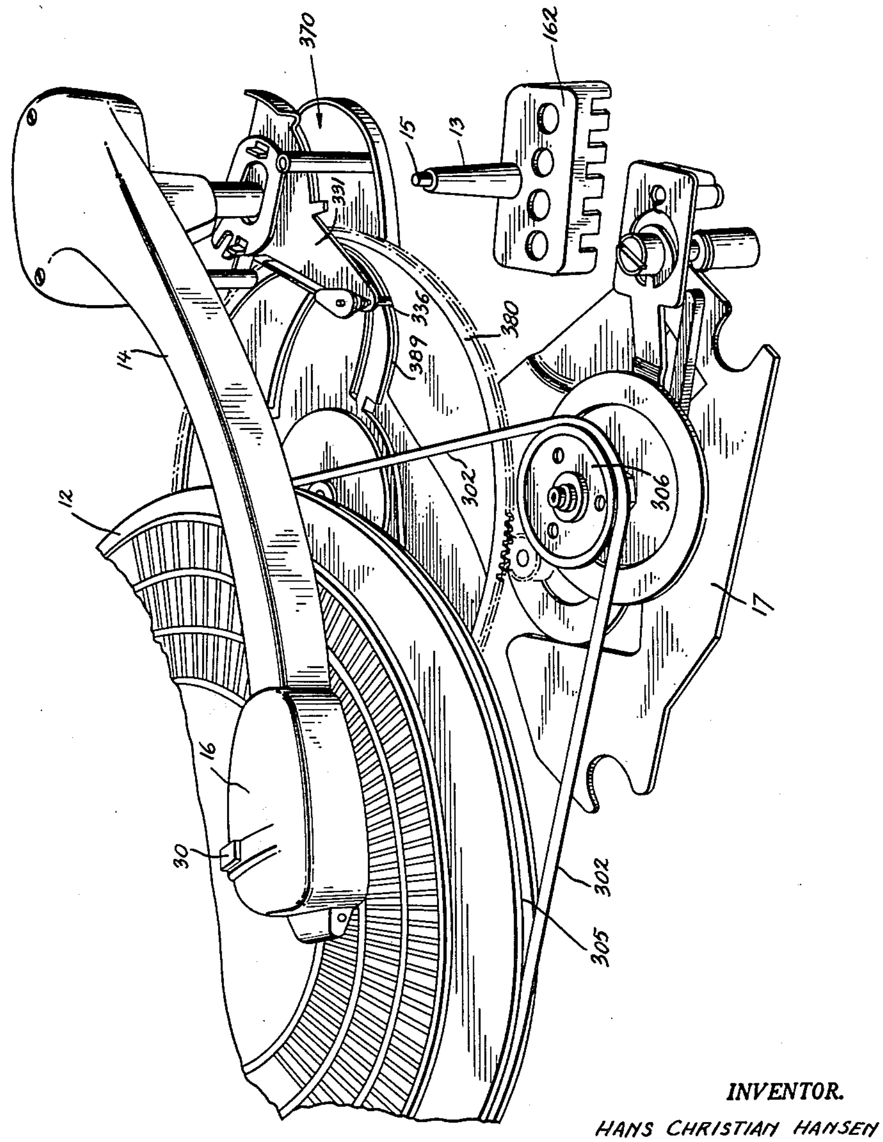
Figures 22, 23:
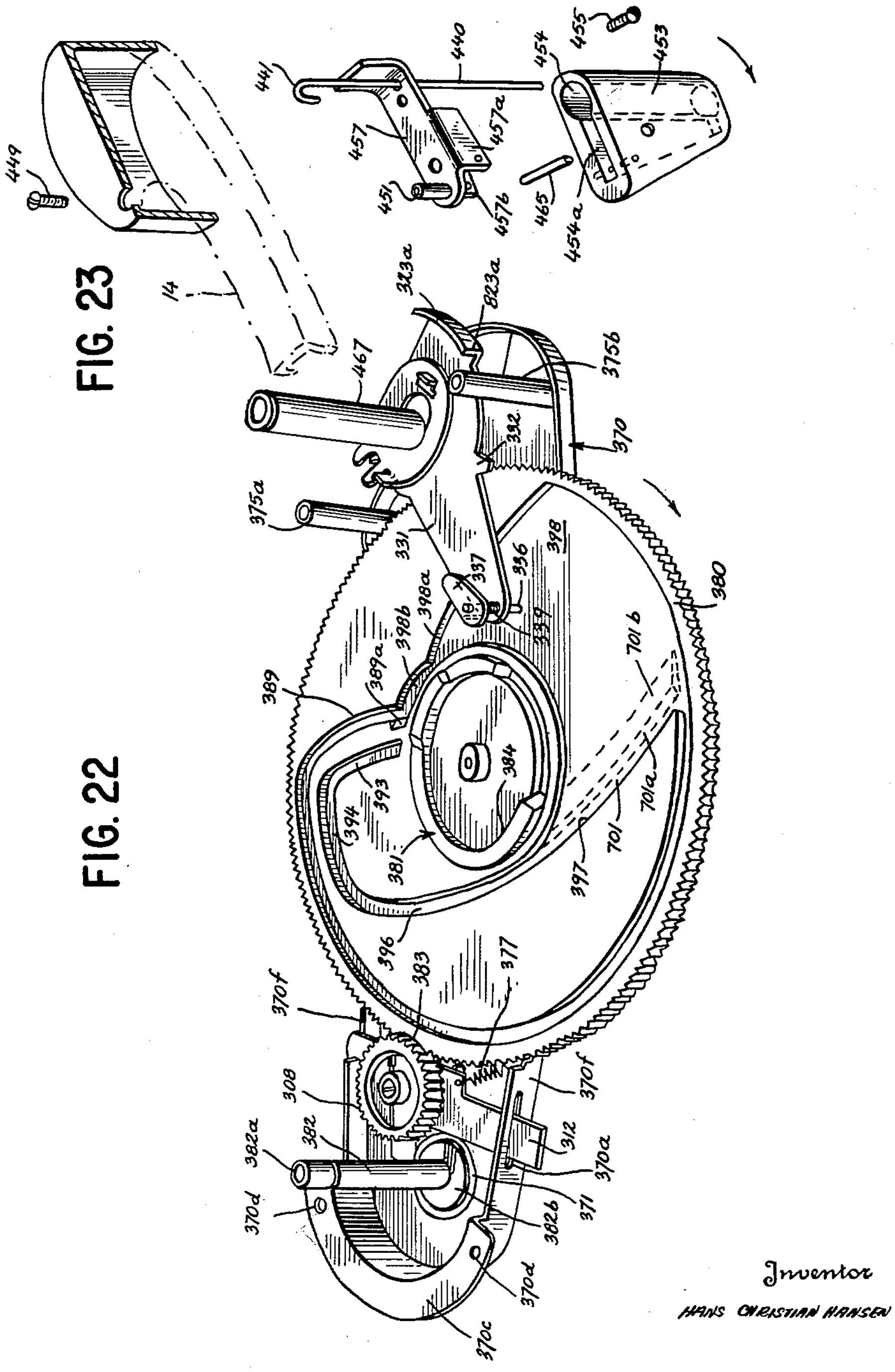
Figures 24, 25:
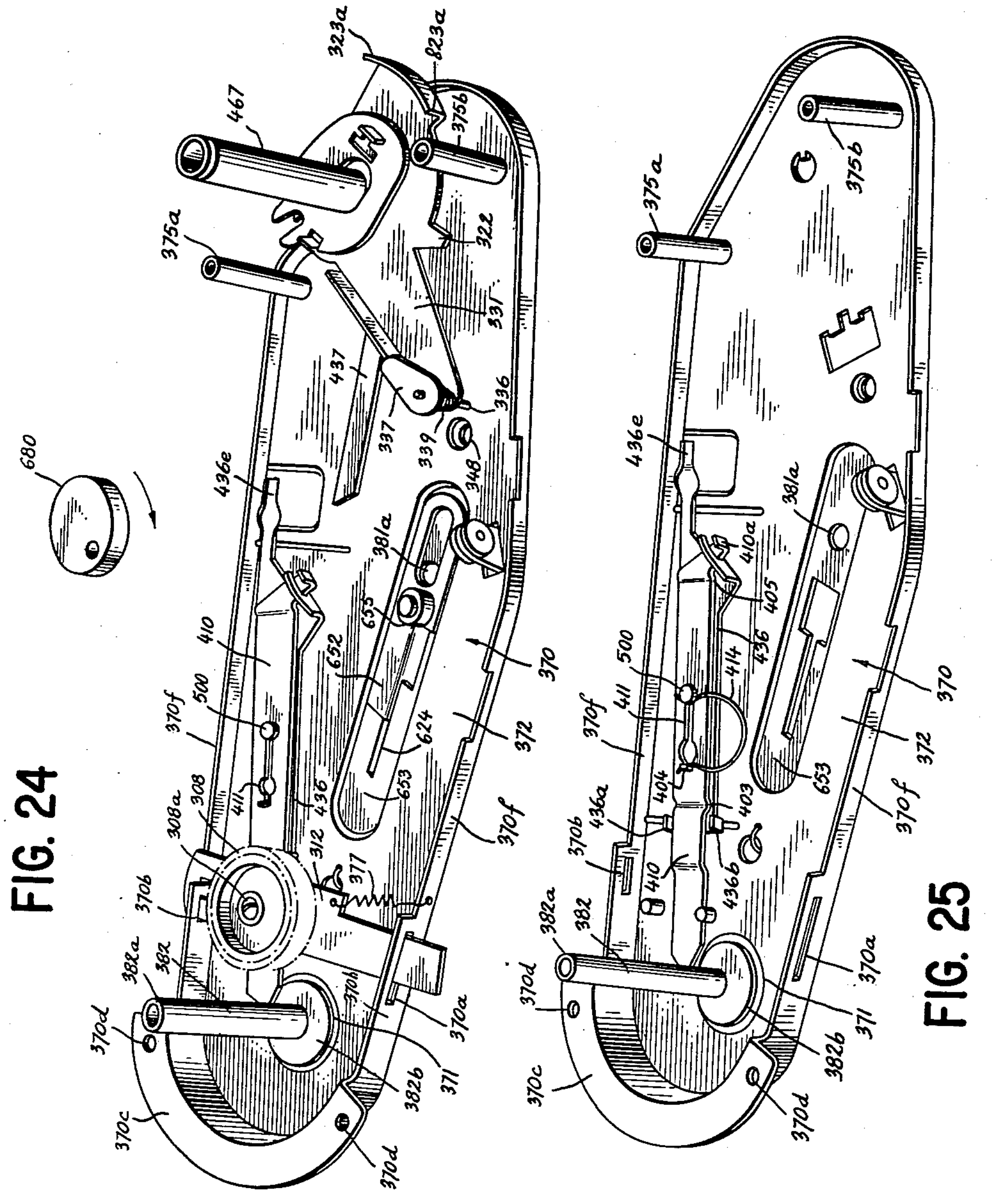
Figure 26:
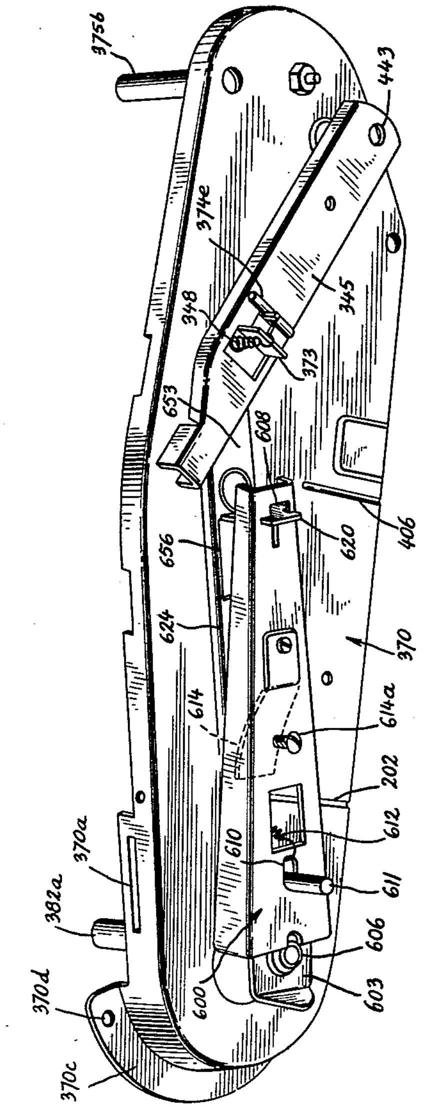
Figure 27:
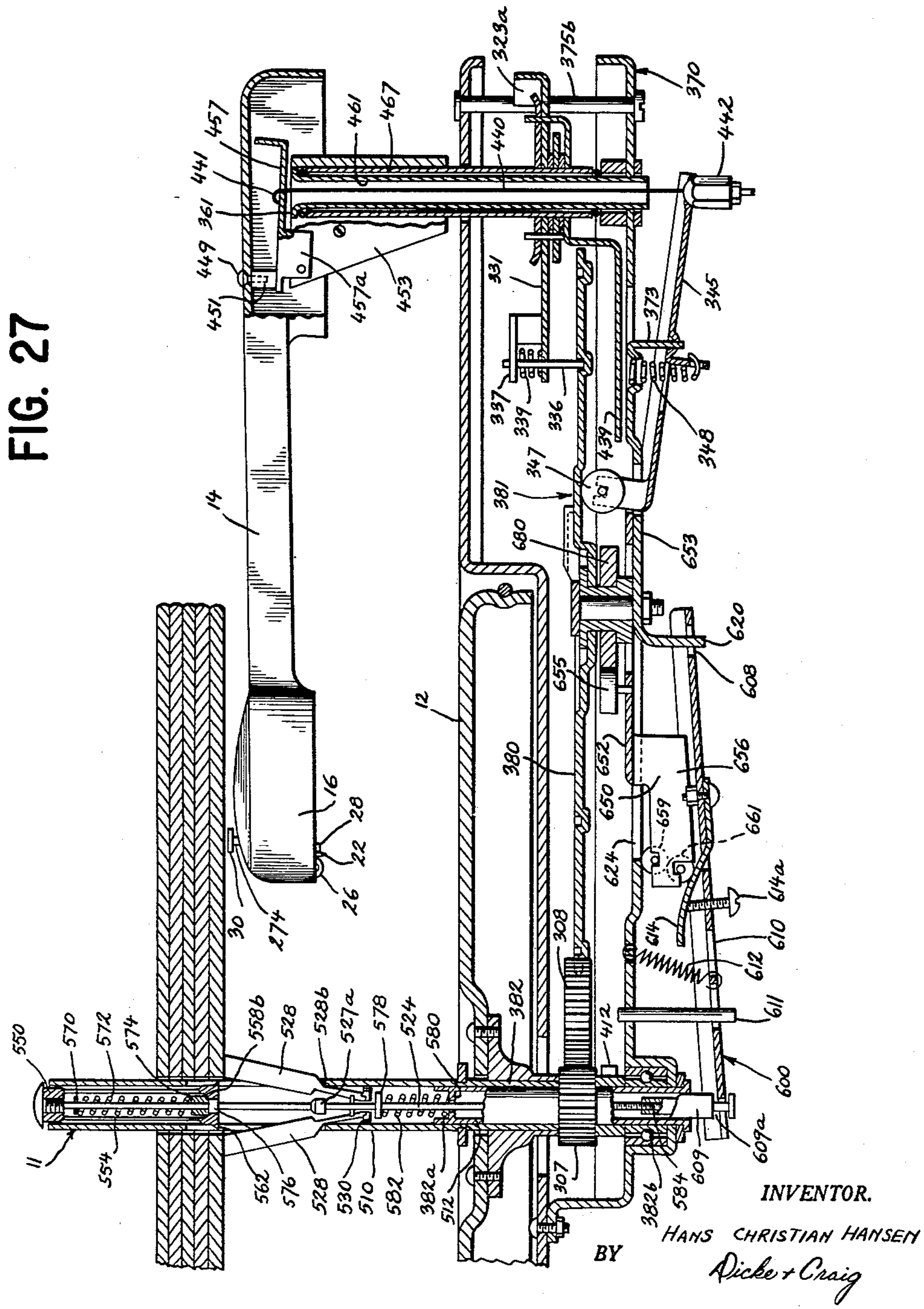
Figure 28:
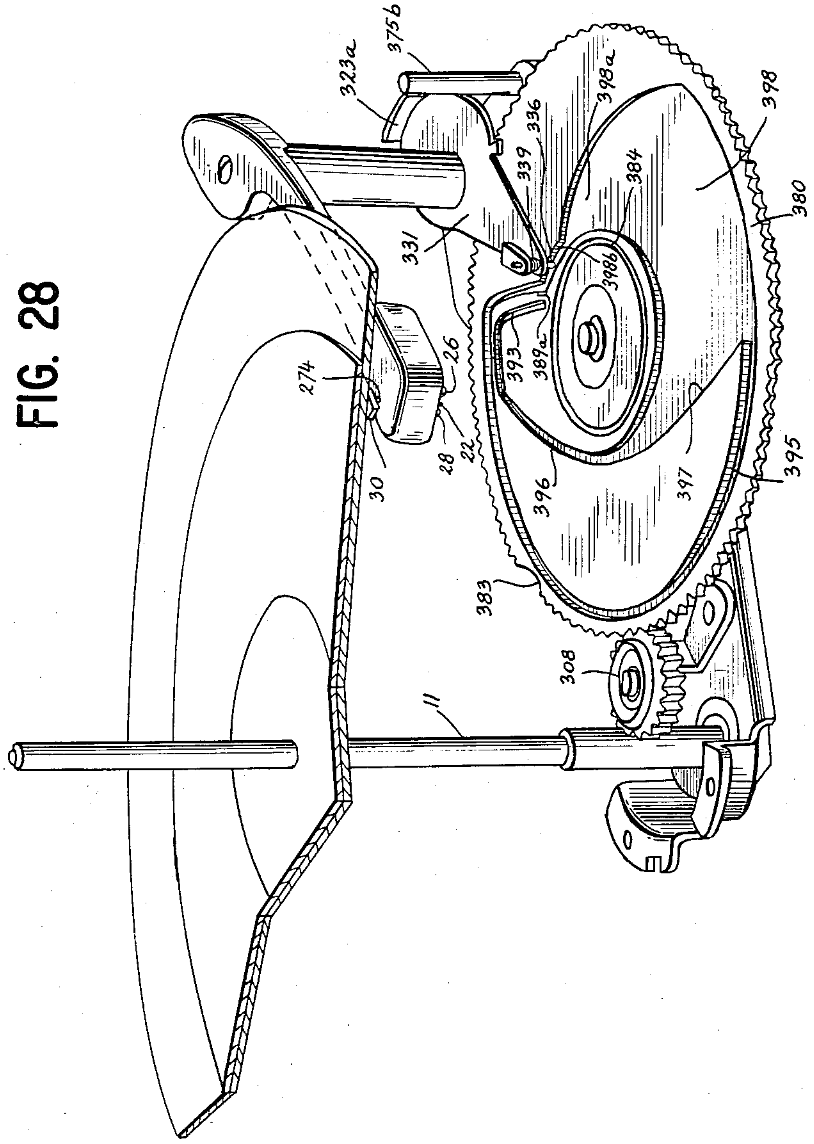
Figure 29:
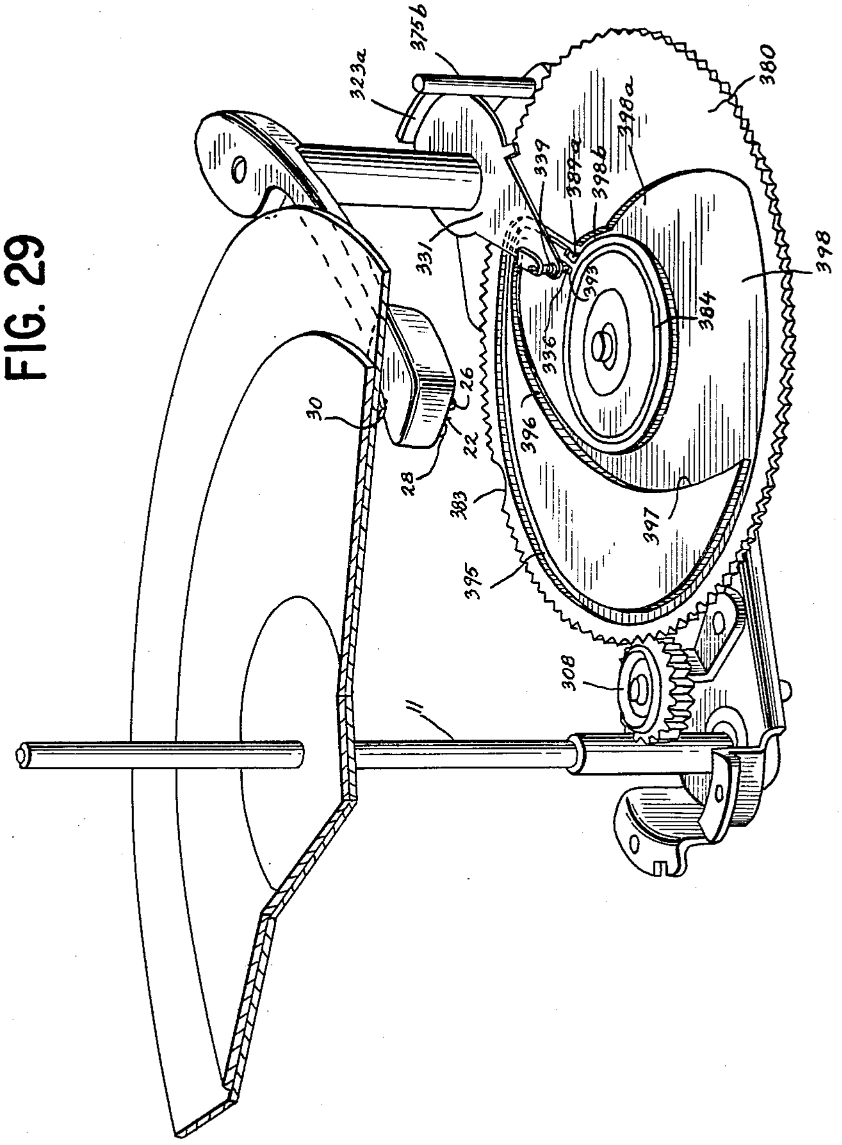
Figure 30:
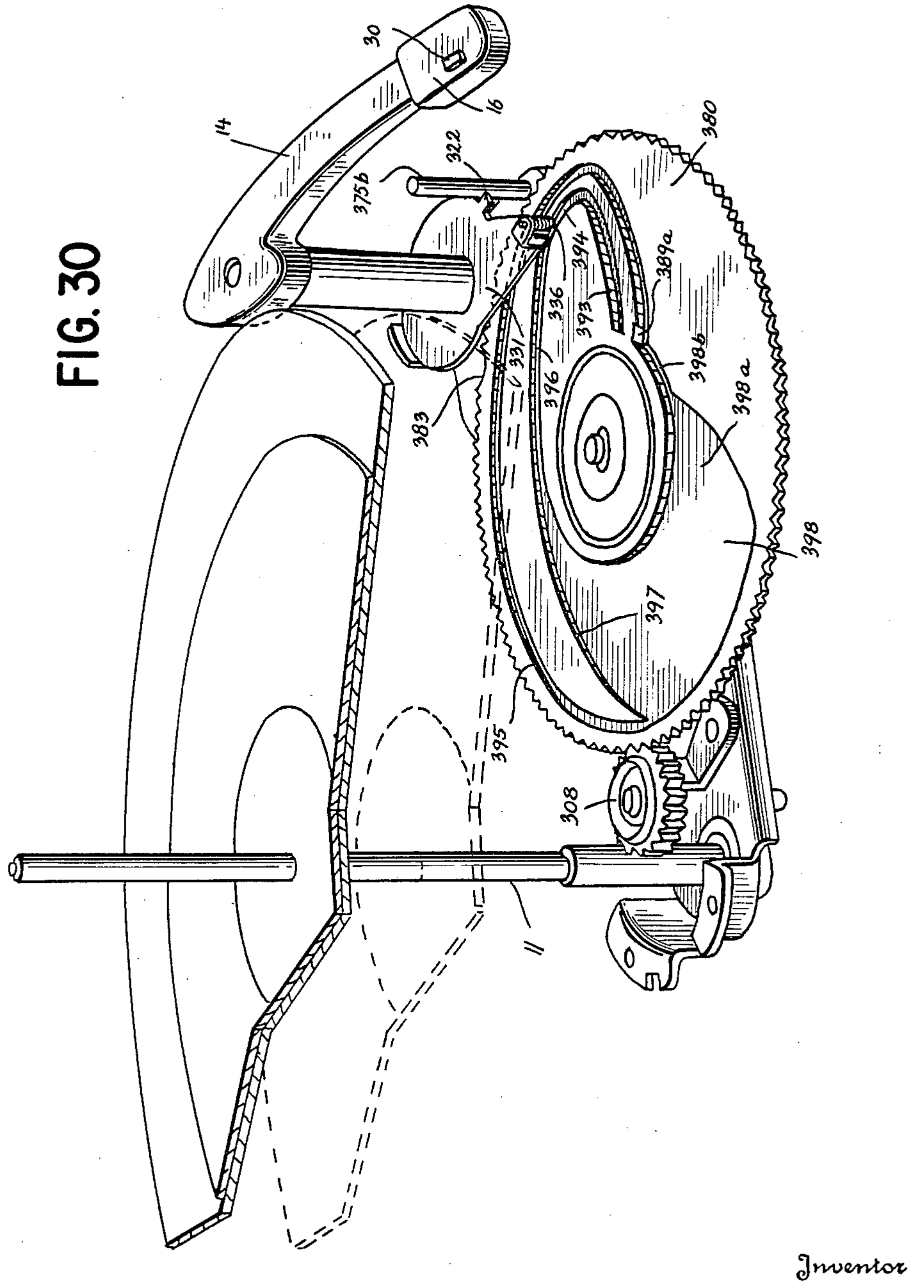
Figure 31:
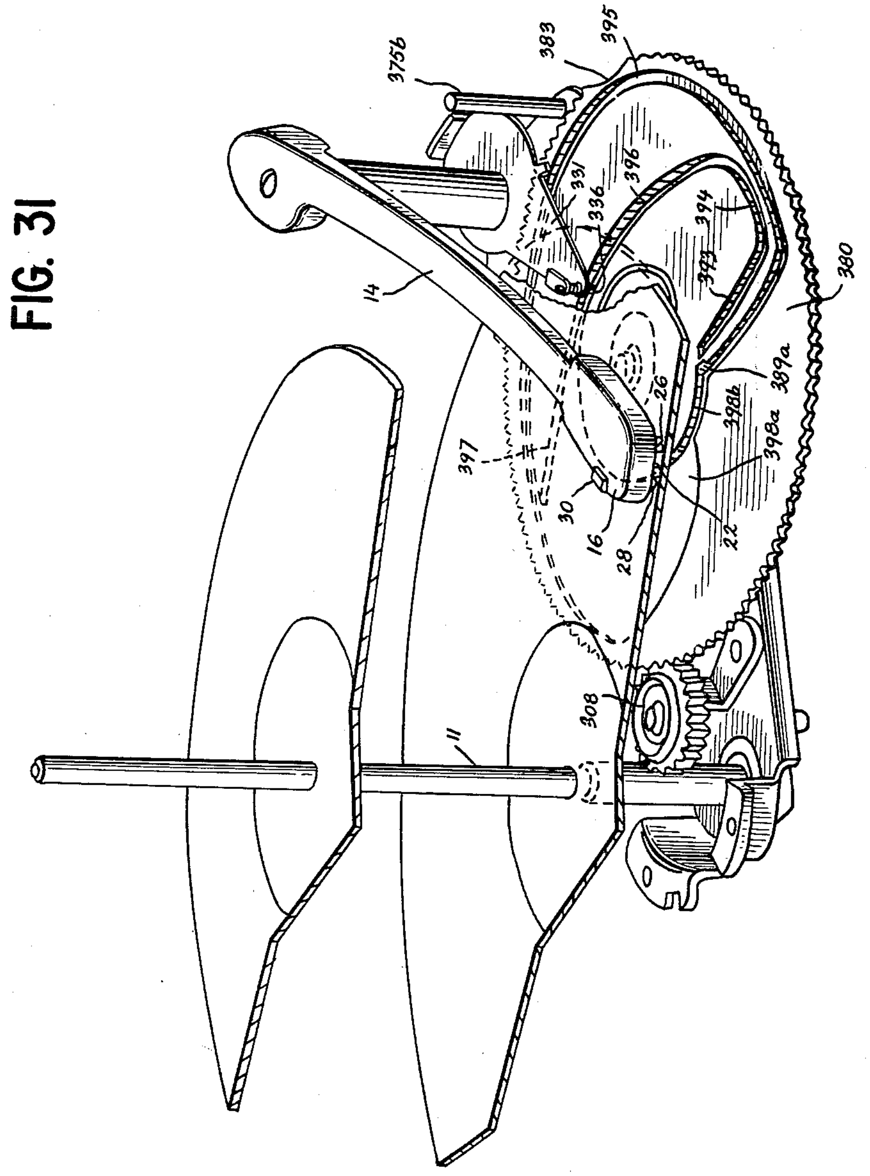
Figure 32:
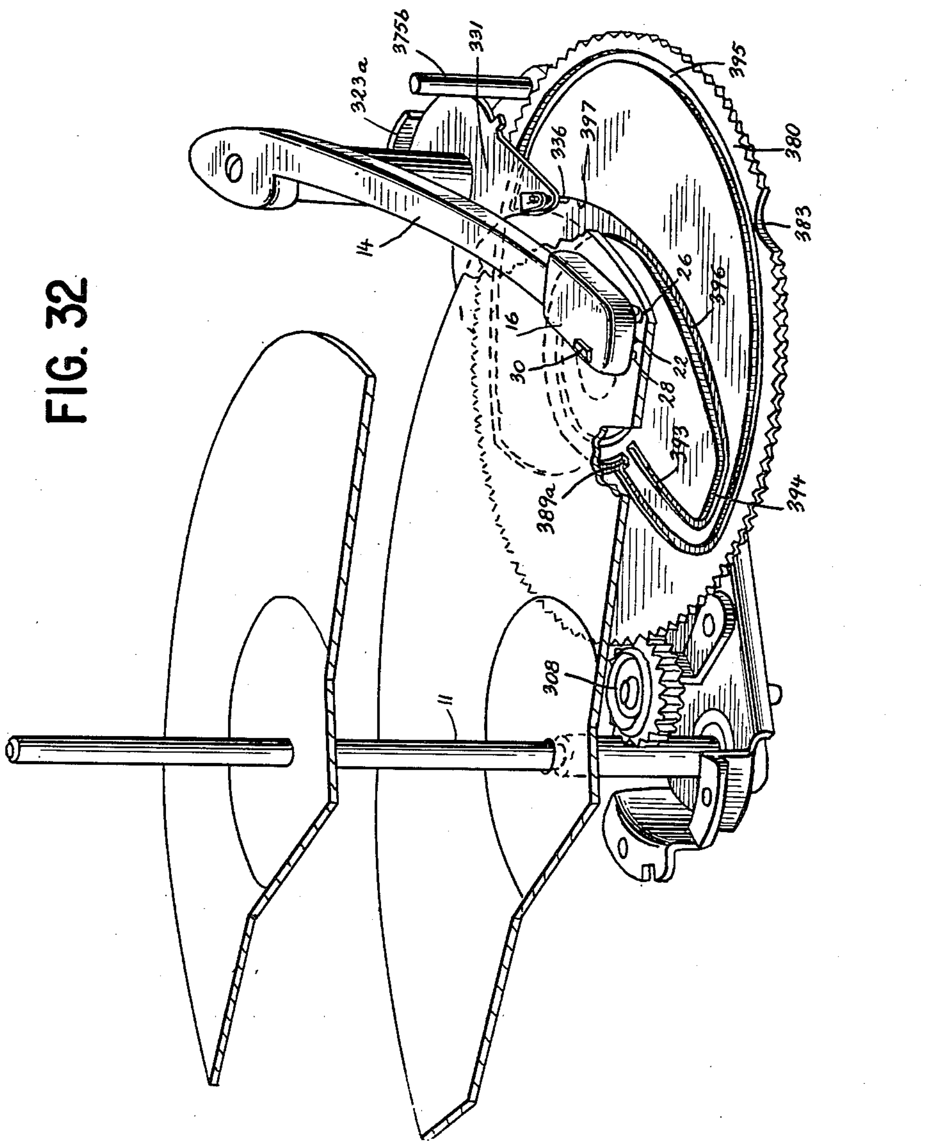
Figure 33:
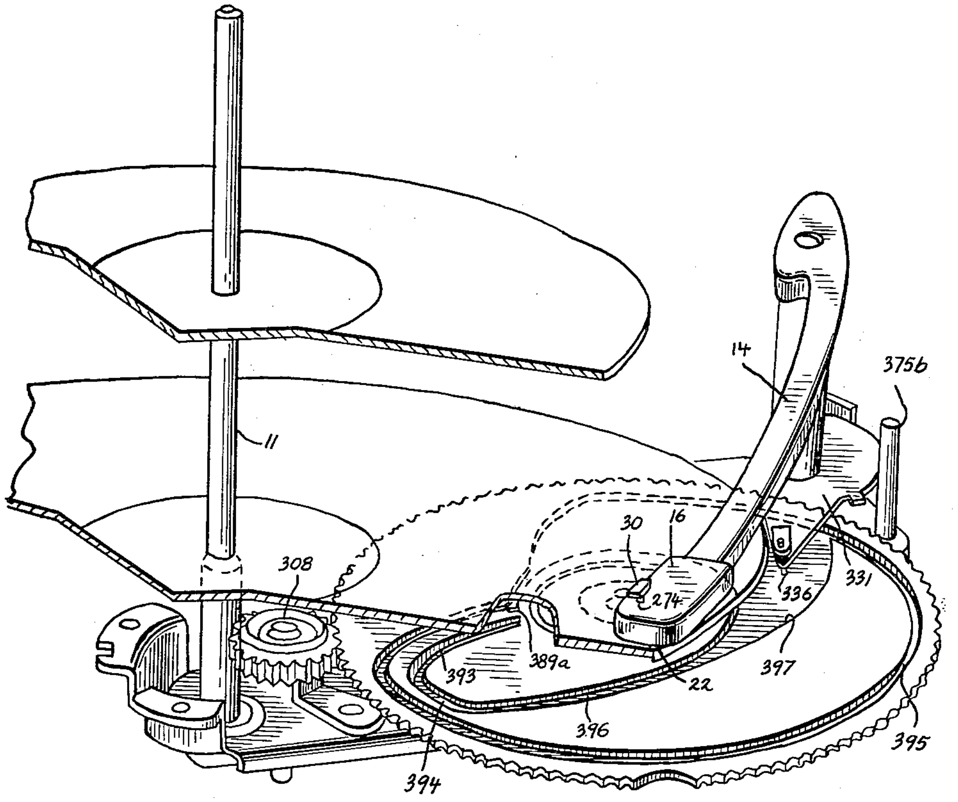

Various embodiments of apparatuses according to the invention will be described by way of example with reference to the accompanying drawings, wherein FIGURE 1 is a general perspective view of a record changing phonograph according to the invention, FIGURE 2 is an end view of the tone arm showing the tone arm supported on the surface of a record in one position of operation of the trackfinder mechanism, FIGURE 3 is the same view showing the parts in another position, FIGURE 4 is the same view showing the parts in the last part of the operating position, FIGURE 5 is a longitudinal section through the exterior end of the tone arm shown in FIGURES 2–4, showing the parts in a projected position, FIGURE 6 is the same section showing the parts in a retracted position, FIGURE 7 is a partial perspective view of the parts shown in FIGURES 5 and 6, FIGURE 8 is an inverted plan view of the tone arm shown in FIGURES 5–7, FIGURE 9 is an exploded perspective view of a modified embodiment of the track finder mechanism, FIGURES 10–12 are views corresponding to the views of FIGURES 2–4 and showing the embodiment of FIGURE 9 in three different operative positions, FIGURE 13 is a vertical section through the embodiment of FIGURE 9 when assembled, FIGURE 14 is a perspective view partly in section of a further embodiment of the trackfinder arrangement according to the invention, FIGURE 15 is an inverted plan view of the mechanism shown in FIGURE 14, FIGURE 16 is a section through the embodiment of FIGURE 15, seen from the left hand side, FIGURE 17 is a similar section seen from the right hand side, FIGURE 18 is a sectional end view of the embodiment shown in FIGURES 14–17, FIGURE 19 is a perspective view of a detail of the embodiment of FIGURES 14–18, FIGURE 20 is an exploded perspective view of the parts of the embodiment shown in FIGURES 14–19, FIGURE 21 is a perspective view showing a part of the turntable and the control mechanism of a phonograph shown in FIGURE 1, FIGURE 22 is a perspective view of the control mechanism seen from the top side, FIGURE 23 is an exploded, perspective view illustrating the tone arm bearing, FIGURE 24 is a perspective view of a part of the assembly illustrated in FIGURE 22 with the cycling cam removed, FIGURE 25 is a similar perspective view with some of the parts shown in FIGURE 24 removed, FIGURE 26 is a perspective view of the assembly shown in FIGURES 24 and 25, seen from the bottom, FIGURE 27 is a vertical section through the phonograph shown in FIGURES 1 and 21–26, FIGURE 28 is a perspective view of the parts of the phonograph illustrating the activation of the trackfinder mechanism, FIGURE 29 is a similar perspective view showing the parts in a position after the trackfinder mechanism has been activated, FIGURE 30 is a similar perspective view showing the parts in a later stage of operation, FIGURE 31 is a similar perspective view showing the parts during operation of the trackfinder mechanism, FIGURE 32 is a similar perspective view showing the parts in position when the trackfinder mechanism is released, and FIGURE 33 is a similar perspective view showing the parts after the trackfinder mechanism has been released and disengagement has taken place between the parts of the control mechanism.

FIGURE 1 is a general perspective view of a phonograph according to the invention seen from the top side. The phonograph comprises a base or chassis plate 10 above which appears a turntable 12, a tone arm 14 having a pickup head 16 and a center spindle 11. The center spindle may be of any convenient type operable to support a stack of records to be released one by one to be supplied to the playing position on the turntable 12 in which position the top side of the records are played by the tone arm stylus.

In FIGURE 1, reference numeral 20 designates a speed selector knob for adjusting the velocity of the turntable to a desired one of different velocities. The turntable is driven from a phonograph motor 17. Reference numeral 13 designates a stationary support for the tone arm in its inoperative position, and reference numeral 15 designates an activating member reciprocally mounted in the post 13 and operable to open an electric switch in the phonograph motor circuit under influence of the weight of the tone arm when the latter is deposited on the post 13. Reference numeral 21 designates a starter push button which, when depressed, controls the start of the phonograph.

Neither the switch arrangement nor the starter push button arrangement will be described in further detail because these parts are well known in the art and can easily be designed in accordance with desired conditions by those skilled in the art.

In the pickup-head an indexing device or trackfinder mechanism is provided comprising a primary supporting member 26 (FIGURES 2–8) and a secondary release control member 28.

In the embodiment to be described in the following the primary supporting member is in the form of a light friction member and more specifically in the form of a small wheel or roller which will rotate when in contact with the top surface of a record supported on the turntable.

Preferably the primary supporting roller 26 is arranged in such an inclined position that it will form an angle with radius extending through its point of engagement with the surface of the record so as to thereby cause the tone arm to be moved outwardly across the surface of the record when the latter rotates.

As shown in FIGURES 2–4 the members 26 and 28 are movable between a projecting position in which the tip of the stylus member 22 is kept in spaced relationship above the surface of the record 24 and a retracted position as shown in FIGURE 4 in which the stylus tip is allowed to engage and be deposited in the sound track of the record.

The primary supporting roller 26 projects slightly more than the secondary member 28 which in the embodiment according to FIGURES 2–4 is in the form of a friction member and therefore is free of the record surface as long as the roller 26 engages the latter.

When the roller 26 arrives at the edge of the record to the position shown in FIGURE 3 the support of the tone arm will be taken over by the friction member 28. The mechanism is so designed that the friction between the member 28 and the record surface will release both members from the projecting position shown in FIGURE 2 to the retracted position shown in FIGURE 4 with the result that the stylus tip 22 will be deposited in the initial sound track of the record.

In order to activate or actuate the track finder mechanism to move the two members 26 and 28 from the inoperative position shown in FIGURE 4 to the operative position shown in FIGURE 2, an activating or actuating member 34 is provided as more specifically shown in FIGURES 5–8. The activating member 34 is more specifically in the form of a reciprocally arranged pin the top end of which extends above the top surface of the pickup head 16 and which, when depressed, will control movement of the parts of the trackfinder arrangement into their operative position. The top end of the activating member 34 is provided with a friction member 30 which may be in the form of a suitable friction material. This friction member 30 may, for example, be in the form of a strip of natural or synthetic rubber which by a suitable holder (not shown) can be supported on the top end of the activating member 34. The friction strip 30 may, however, within the scope of the invention also be secured to the top surface of the pickup head 16 and arranged to yield downwardly so that, when the friction member is pressed down, it will also cause the activating member 34 to be pressed down. The activation of the trackfinder arrangement is according to the invention caused by raising the tone arm to a position in which the friction member 30 engages the underside of the lowest record supported on the center spindle 11 in a manner to be described more fully in the following.

In the tone arm head 16 there is supported a pickup cartridge 36 from which the stylus tip 22 projects, as shown in FIGURES 5 and 6. In the embodiments shown in FIGURES 5–8 a lever 38 is provided in the tone arm head. The lever 38 has an inclined slot 40 by means of which it is guided on a stationary pin 42 secured inside the pickup head. The rear end of lever 38 has a shoulder 44 adapted to engage a stationary pin 46 when the trackfinder mechanism is in the operative position shown in FIGURES 5 and 7. In this position a spring 48 which engages a stationary pin 50 in the pickup head and the pin 52 on the lever 38 keeps the shoulder 44 in engagement with the pin 46 so as to retain the parts in the operative position. In the inoperative position shown in FIGURE 6 the arm 38 is moved relatively to the pin 42 so that the latter is now located in the region of the lower rear end of the slot 40 and the rear end of the arm or lever 38 disengaged from the pin 46. As will be apparent from FIGURE 6 a depression of the activating member 34 will bring the parts from the inoperative position or FIGURE 6 to the operative position shown in FIGURES 5 and 7, the spring 48 being operable to latch the shoulder 44 in engagement with the pin 46.

As most clearly shown in FIGURE 7 the front end of the arm 38 is provided with a bifurcated member 54 forming a bearing for the roller 26 which is mounted freely rotatably by means of a small pin (not shown). The secondary friction member 28 is in the form of a rubber sleeve or the like 56 which surrounds an arm 58 extending sidewardly from one leg on the bifurcated member 64.

As will be clearly understood from the foregoing description the frictional engagement between the friction member 56 and the top surface of the rotating record will cause the arm 38 to be pulled forward against the action of a spring 48 whereby the arm 38 guided by the pin-and-slot connection 40, 42 also will be swung counterclockwise. When, during this movement of the arm 38, its rear end is free of its latching connection with the pin 46, the spring 48 will press the rear end of the arm downward and retain it in the inoperative position of the trackfinder mechanism.

It will also be understood that the secondary member 28 of the trackfinder mechanism due to its arrangement in a trailing position relatively to the primary supporting roller 26 by its frictional engagement with the top surface of a record when the roller 26 has dropped over the edge thereof will impose a frictional restraint on further outward movement of the tone arm, i.e. interrupt the outward swinging movement of the tone arm as caused by the engagement between the roller 26 and the surface of the rotating record.

FIGURES 9–13 illustrate a modified embodiment of the arrangement shown in FIGURES 2–7. In FIGURES 9 and 13 only the trackfinder mechanism is shown. This is in the form of a unit comprising a supporting member generally designated by reference numeral 102 adapted to be secured in the interior of the pickup head 16. The supporting member 102 is in the form of a downwardly open casing having a top wall 104, side walls 106 and 108 and preferably a downwardly extending front wall flap 110 having an aperture 112 for the passage of the shaft through the pickup cartridge in the event that a turnover pickup cartridge is used.

In the side wall 106 a hole 114 is provided, and in the side wall 108 a hole 116 in which holes a pin (not shown) which forms a supporting shaft for the movable part of the mechanism is received.

This movable part comprises a frame having a transverse top portion 118 and side portions 120 and 122 in each of which holes 124 and 126 respectively are provided to cause the frame to be swingingly or tiltably supported on the pin received in the holes 116 and 114.

The front end of the frame side portion 122 has a bifurcated portion 128 in which the primary supporting roller 26 is rotatably arranged about a pin 130. Slightly above the top of the roller 26 there is provided a hole 132 in the side portion 122 and opposite this hole there is provided a hole 134 in the front end of the side portion 120.

Between the side portions 122 and 120 there is swingingly or tiltably arranged a member generally designated by reference numeral 136 and having sidewardly extending flaps 142 and 144 engaging the holes 132 and 134 so as to enable the member 136 to swing or tilt. More specifically the member has two downwardly extending legs 138 and 140. The leg 140 has a downward extension which is bent at the end and on which the high friction sleeve 28 is arranged. The member 136 further has a lug 152 receiving one end of a spring 154 the other end of which is connected to the supporting member 102. The supporting member 102 further has an interior downwardly extending flap generally designated by reference numeral 146 provided with a pair of shoulders 148 and 150 in different spaced relation from the top wall 104 of the supporting member 102. The actuating member 34 is mounted for reciprocating movement in a hole in the top wall 104 of the member 102.

The mode of operation will easily be appreciated from the above explanation of the structure and with reference to the section shown in FIGURE 13 which shows the parts in the operative position. The parts are brought to the operative position by depressing the actuating member 34. The supporting structure 118, 120, 122 is thereby tilted about the pin received in the holes 114 and 116 against the action of a spring 154, the tension of which also imposes a tilting force on the member 136 in a direction opposite to the arrow F shown in FIGURE 13 so that the top end of the member 136 is disengaged from the shoulder 148 and is tilted into engagement with the shoulder 150. This engagement causes latching of the trackfinder structure in the operative position as shown in FIGURE 13.

When the tone arm is supported on the top of the record 24 as shown in FIGURE 10, it is moved outwardly toward the edge of the record and when, as shown in FIGURE 11, the primary roller 26 drops over the edge of the record, the friction sleeve 28 engages the top surface of the record. This engagement imposes a frictional restraint to any further outward movement of the tone arm and thereby interrupts the swinging movement of the tone arm. Furthermore the rotation of the record causes by this engagement the member 136 to swing in the direction of the arrow F shown in FIGURE 13 so as to cause the top end of the member 136 to be disengaged from the shoulder 150 whereby the track finder mechanism is unlatched and the stylus tip is deposited in the initial sound groove of the record as shown in FIGURE 12.

A further embodiment of a trackfinder arrangement to be used with a phonograph according to the invention is shown in FIGURES 14–20. Also in this embodiment the track finder mechanism is included in the pickup head 16 with the two member on rollers 26 and 28 arranged on each side of the pickup cartridge 200. More specifically this cartridge is of the turnover type provided with an extending spindle 202, see FIGURE 15 and a handle 204 for turning over the cartridge so as to select the desired stylus tip.

Figure 19:
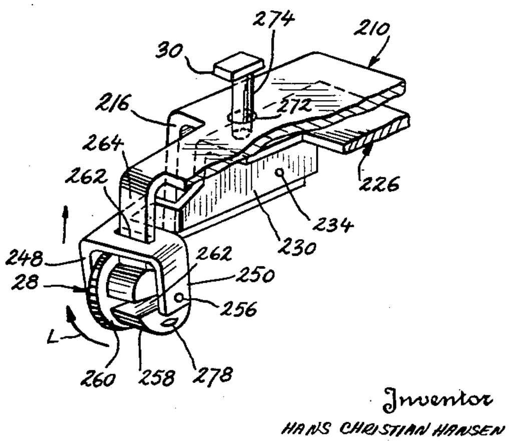

Also this embodiment comprises a supporting member generally designated by reference numeral 210, FIGURES 19 and 20, having a top wall 212 and side walls 214 and 216 in which holes 218 and 220 respectively are provided for small pivot pins 222 and 224. The supporting member for the low friction member or primary roller 26 and the high friction member 28 or trailing member is generally designated by reference numeral 226 (FIGURE 20). This member 226 is provided with a top portion 228 and side walls 230 and 232 having holes 234 and 236 for receiving the pivot pins 222 and 224.

The side wall 232 has at its front end a bifurcated portion 238 for supporting the primary supporting roller 240 which is rotatably arranged on a small spindle or pin 242 the one end of which extends slightly beyond the bifurcated portion 238 so as to form anchorage for one end of a spring 244.

Also the side wall 230 is provided with a bifurcated portion having a top part 246 and side walls 248 and 250 as most clearly seen in the perspective views of FIGURES 19 and 20. In the side walls there are provided holes 252 and 254 respectively for receiving a small spindle 256 adapted to support the friction member or trailing member 28 which in this embodiment is in the form of a roller 258. In the embodiment shown this roller has an end flange 260 of a frictional material, for example natural or synthetic rubber. The roller 258 further has a radially extending slot 262*a*. The top wall 246 of the bifurcated portion has an aperture 262 to receive a downwardly extending flap 264 of the top wall 212 of the supporting member 210. As in the case of the embodiment shown in FIGURES 9–13 the top wall 212 is also provided with a downwardly directed extension 266 having a hole 268 receiving the pickup cartridge spindle 202.

The top end of the spring 244 is at 270 secured to the supporting member 210. When the parts shown in the exploded view in FIGURE 20 are assembled with the different parts in the respective positions it will be understood that the lower end of the downwardly extending flap 264, which extends down through the aperture 262 can be received in the slot 262*a* of the roller 258. This is the inoperative position of the parts of the trackfinder mechanism and the parts are retained in this position by the tension of the spring.

In the top wall 212 of the supporting member 210 there is further provided a hole 272 for the passage of a reciprocable pin 274 which is the actuating member, the lower end of which bears against the top surface of the top wall 228 of the structure 226. When the actuating member 274 is pressed down the structure 226 is tilted about the pins 222 and 224 against the action of the spring 244 whereby the lower end of the flap 264 is disengaged from the slot 262*a* in the roller 258.

In order to cause the parts to be latched in this depressed operative position means are provided for automatically turning the roller 258 to bring the slot 262 therein out of alignment with the flap 264. Such means may be in the form of a spring (not shown) or as illustrated in the drawing the turning of the roller 258 is obtained by gravity control for which purpose a small weight 278 is embedded eccentrically in the roller 258 which may be moulded of a suitable plastic material incorporating the weight.

It will be understood that when the structure is pressed down to allow the roller 258 to rotate it will rotate through an angle governed by the location of the weight 278, for example to assume a position shown in FIGURE 19. The mechanism is latched in this position with the lower end of the flap 264 engaging the periphery of the roller 258.

In this embodiment the secondary member or roller 258 is arranged at such an angle opposite the angle of the roller 240 that when the roller 258 engages the surface of a record its angle with respect to the radial line extending through the point of engagement with the record will be opposite that of the angle of the roller 240 so as to cause the rotation of the roller 258 to move the tone arm 16 inwardly.

From the description of the structure according to FIGURES 14–20 it will be understood that its mode of operation basically is the same as that of the two precedingly described embodiments. When, however, the trailing roller 258 engages the top surface of the record after the primary roller 240 has dropped over the edge thereof, the frictional restraint against further movement of the tone arm will be larger than in the case of the two preceding embodiments, because the roller 258 will not only prevent further outward movement of the tone arm but cause inward movement of the tone arm 14 during its rotation which continues by the engagement with the rotating record in the same direction of the arrow K shown FIGURE 20 as the direction in which the roller was turned under influence of the weight 278. In other words the roller 258 will rotate the remaining part of its revolution which by suitable selection of its inclination will be sufficient to secure that the tone arm is drawn inwards so as to engage an abutment against the edge of the record and thereby secure the correct position of the stylus tip relatively to the initial sound groove of the record. The member used for such engagement is preferably the primary roller 240.

It will be understood that a trackfinder arrangement according to any one of the embodiments described hereinbefore can be used in connection with the phonograph generally illustrated in FIGURE 1, the design and structure of which is more specifically illustrated in FIGURE 21–27. It will further be understood that the construction of the trackfinder arrangement is not limited to the specific embodiments shown and described and that various modifications of the trackfinder arrangement will be possible within the scope of the invention.

More specifically the phonograph according to my invention provides a flat change cycle controlling cam disc generally designated by reference numeral 380 mounted to rotate through one complete revolution to control the change cycle. In the surface of the cam disc 380 there is provided a group of cam tracks for controlling inward and outward swinging of the tone arm 14 and in the center of the cam disc a lifting cam portion generally designated by reference numeral 381 is provided operable to control raising and lowering of the tone arm and to retain the tone arm in different horizontal planes between the raising and lowering thereof in timed relationship to the horizontal swinging movement of the tone arm.

The turntable has a peripheral flange with an annular exterior recess 305 (FIGURE 21). An elastic driving belt 302 for the turntable passes over the turntable engaging in the recess 305 and over a pulley 306 which by suitable gear means (not shown) can be driven from the spindle of the phonograph motor 17 at a plurality of different speeds to be selected by the speed selector knob 20 (FIGURE 1). The driving arrangement does not form part of the present invention and will therefore not be described in more detail in the following, though it will be understood any other type of driving arrangement such as a driving friction wheel in engagement with the flange of the turntable also can be used.

Means are provided to rotate the cam disc 380, for example as illustrated in the form of a gear wheel 308 (FIGURES 22, 24 and 27) which engages between the toothed periphery of the cam disc 380 and a gear wheel 307 (FIGURE 27) mounted on a power driven spindle such as the turntable spindle 11. A trip starter arrangement which will be described in more detail in the following operates to initiate rotation of the cam disc 380 after playing of a record, and means, for example a recess 383 (FIGURE 22) in the periphery of the cam disc 380 in which the gear wheel 308 can be received and thereby caused to disengage from the gear wheel 307 mounted on turntable spindle operates to stop the rotation of the cam disc 380 after the change cycle.

The cam disc 380 is mounted on an auxiliary base plate generally designated by reference numeral 370 which forms the base plate for the majority of the parts of the change cycle mechanism which are assembled in the form of a sub-assembly shown in FIGURE 22. The base plate or bridge member 370 is secured below the chassis plate of the phonograph in spaced relationship relatively thereto by means of a pair of pins 375*a* and 375*b* at one end and a flange 370*c* at the other end having a pair of holes 370*d* for mounting screws (FIGURES 22, 24 and 25).

The turntable top is rotatably arranged on a hollow spindle 382 firmly secured to the bridge 370 adjacent one end thereof and extending out through an aperture in the chassis 10 such as most clearly seen in the section FIGURE 27. The turntable bushing 382 is at its lower end supported on a suitable bearing arrangement 382*b* and is surrounded by the gear wheel 307.

The gear wheel 308 is rotatably mounted by means of a pin 308*a* (FIGURE 24) on a flat arm 312 (FIGURES 22 and 24), the front end of which is slidably guided in a slot 370*a* in a flange 370*f* extending outwardly at the edge of the bridge 370 and the rear end of which is formed like a hook engaging in a second stop 370*b* of this flange so that the arm 312 can reciprocate. Between the arm 312 and the bridge a spring 377 (FIGURES 22 and 24) is interposed and operates to pull the arm 312 in such a direction that the gear wheel 308 is normally wedged in between the periphery of the cam disc 380 and the gear wheel 307 on the turntable bushing 382. The design of these parts is so that when the gear wheel 308 falls into the recess 383 in the periphery of the cam disc 380, the spring 377 will by means of its pulling action on the arm 312 also tilt the arm so much that the gear wheel 308 will be disengaged from the driving gear wheel 307. The rotation of the cam disc is stopped thereby.

The tone arm 14 is swingingly arranged on a vertical spindle which as most clearly shown in FIGURE 27 is in the form of two concentric tubes 461 and 467. The interior tube 461 is secured on the bridge 370 and the exterior tube is rotatable by means of suitable light friction bearings (not shown) about the interior tube 461. As shown in FIGURE 27 and the exploded view of FIGURE 23 the tone arm supporting structure comprises a member 453 having a hole 454 for receiving the exterior tube 467. The member 453 further has a slot 454*a* to enable it to be clamped on the tone arm spindle 467 by means of tightening screws 455. The member 453 further has a transverse hole for receiving a pin 465 on which a bracket 457 is tiltably mounted by means of a pair of holes in downwardly extending flaps 457*a* and 457*b* thereof (FIGURE 23). The tone arm 14 is connected with the tiltable member 457 by means of a screw 449 engaging in a screw-threaded hole provided in a post 451 secured to the member 457. It will be understood that the tone arm 14 can be raised and lowered thereby when the member 457 tilts on the pin 465.

To control raising and lowering of the tone arm 14, an elongated control pin 440 extends down through the hollow tone arm spindle structure. The top end of the pin 440 is bent so as to engage when pulled down in a pair of holes in the member 457 and thereby cause this member to be tilted clockwise as seen in FIGURES 23 and 27.

The control rod 440 passes down through an aperture 443 (FIGURE 26) in a raising control lever 345 (FIGURES 26 and 27) which is tiltably supported on a member such as a flap 373 extending below the bridge 370 so that control lever 345 can swing in vertical plane. The lower end of the control rod 440 is screw-threaded and provided with an adjustable nut 442 or the like (FIGURE 27) adapted to be engaged by the right hand end of the raising lever 345 to raise the tone arm 14 when the raising lever 345 is swung clockwise, as viewed in FIGURES 26 and 27, and to lower the tone arm for being deposited with the stylus in engagement with a record supported on the turntable when the raising lever is swung counterclockwise whereby its right hand end is disengaged from the top of the nut 442.

The central cam portion 381 (FIGURE 22) of the cam disc 380 which controls raising and lowering of the tone arm has cam surfaces in various horizontal planes and inclined cam portions therebetween. On the left hand side of the raising control lever 345 a roller 347 (FIGURE 27) is supported and a spring 348 interposed between the raising control lever 345 and the bridge 370 will bias the roller 347 against the lifting cam 381 so as to tend to tilt the raising lever clockwise and thereby raise the tone arm 14.

The inward and outward swinging movements of the tone arm 14 are controlled by means of the plurality of cam tracks in the surface of the cam disc 380 and of a cam follower pin 336 (FIGURE 22) which is mounted on a cam follower arm 331 connected with the tone arm spindle 467.

The cam follower pin 336 is mounted for resilient movement in the direction perpendicular to the plane of the cam disc 380. By way of example the end of the cam follower arm 331 may as illustrated have a flap 337 (FIGURES 22 and 27) extending over the end of the arm 331 in substantially parallel relationship thereto. A pair of holes is provided in the flap and the arm respectively for receiving the pin 336 to allow it to reciprocate and a spring 339 which engages the underside of the flap 337 and a spring washer of the pin 336 will press the pin 336 downwardly but allow it to be pushed up. My invention is, however, not limited to this structure and it is possible within the scope of the invention to have the pin 336 firmly secured to the arm 331 which is tiltable against resilient action in a plane through the geometrical axis of the tone arm spindle such as disclosed in my copending U.K. application Number 30,756/56 and the corresponding U.S. application Serial Number 688,950, now U.S. Patent No. 3,017,188, the disclosures of which hereby are made part of the present disclosure.

The trip starter assembly comprises two arms which are frictionally connected and the front end of which is adapted to be engaged by a nose of the rotating turntable bushing which causes one arm to reciprocate and thereby control initiation of movement of the cam disc 380.

More specifically the trip starter comprises two levers 410 and 436 (FIGURES 24 and 25), both of which are mounted on the bridge 370 below the cam disc 380. These arms 410 and 436 are carried by a pin 500 on which the lower arm 436 is swingingly arranged bearing against a pair of ribs 402 and 406 at each side of the pin 500. Above the arm 436 the pin 500 has an annular groove capable of receiving a keyhole like aperture 411 in the lever 410 which by means of a pair of ribs 403 and 405 bears against the top surface of the lever 436. Between a flap 404 adjacent the broad end of the keyhole like aperture 411 and the pin 500 a spring 414 is interposed serving to keep the lever 410 in its farthest projecting position with the narrow end of the keyhole 411 engaging in the groove of the pin 500. Adjacent its left hand front end the lever 436 has a pair of upwardly bent flaps 436*a* and 436*b* to limit the mutual angular movement between the two levers.

Firmly connected with the tone arm spindle to swing therewith there is secured an extending arm 437 (FIGURE 24) which is operable to actuate the trip starter mechanism by engaging a flap 436*e* at the rear end of the lever 436 so as to swing the trip starter lever assembly anticlockwise to a position in which the front end of the lever 410 can be engaged by a rotating nose 412, see FIGURE 27 on the tone arm bushing 382 which will cause the lever 410 to reciprocate against the action of the spring 414 whereby this lever 410 slides on the pin 500 permitted by reason of the narrow portion of the keyhole like aperture 411.

A record drop control mechanism is included in the center spindle 11 as shown in the cross-sectional FIGURE 27. The spindle 11 is composed of the following parts. The main part is the tubular member 510 having a plurality of longitudinal slots in each of which one of a plurality of members such as prongs 528 is tiltably arranged and able to extend through the slots or to be retracted to the interior of the spindle through the slots. At the lower end of the spindle there is provided a tube 512 of reduced diameter fitting inside the member 510 so that the lower end of the tube 510 forms an abutment by means of which the spindle rests on the top 322, 382*a* of the hollow turntable spindle 382, with the narrow portion 512 of the spindle structure extending down below the bridge 370. Each of the prongs 528 has a top portion and a narrow lower portion and between these portions each of the prongs has an inclined surface 528*b*. The lower ends of the prongs 528 are in operative engagement with a bushing 530 movably arranged in the interior of the tube 510 so that when an interior control rod 524 in the interior of the tube is pulled down an abutment 527*a* on the control rod will engage the top side of the bushing 530 and thereby press the bushing down causing the prongs to follow and thereby being retracted in the spindle by engagement between their inclined surfaces 528*b* and the lower ends of the slots in the tube 510, the inclined surfaces acting as cams. A spring (not shown) engages the lower ends of the prongs to cause them to assume their projecting position when the bushing 530 is pushed up which takes place under action of a spring 582 which interposed between an abutment 578 on the control rod 524 and an interior flange 580. The spring 582 thereby pushes the entire interior control rod 524 upwardly or outwardly so that the abutment 578 engages the underside of the bushing 530 and pushes the latter outwardly. The outward movement of the interior control rod 524 is limited by engagement of the top side of the member 609 against the lower end of the tubular part 512. The member 609 is by means of screw threads 584 or the like adjustably connected with the interior control rod 524. The member 609 further has an annular groove 609*a* which is designed to be engaged by a part of the control mechanism moved by the cam disc as will be more fully described in the following.

In the top end of the spindle 11 a member is arranged having a top portion 550 from which a plurality of elongated springs 554 extend downwardly. Each of these spring members is at its lower end provided with knives or the like 562 adapted to be moved to an exterior position extending in the interstice between the lowest and the next lowest record supported on the center spindle prongs 528 so as to hold the next lowest record of the stack while the lowest record is released when the prongs 528 are retracted. The movement of the knife-members 562 to their operative projecting position is controlled by a member 574 having a lower conical portion engaging with conical interior surfaces 558*b* of the knife-members 562. When an abutment 576 on the control rod 524 during downward movement of the latter is disengaged from the underside of the conical member 574 a spring 572 interposed between the top side of this conical member and a washer 570 on the top end of the control rod 524 will press the conical member 574 down and thereby cause the knife-members 562 to be moved to their projecting operative position.

The center spindle will not be described in any further detail, neither with respect to its mode of operation, because center spindles of this type are known in a plurality of embodiments.

It will be appreciated that the invention is not limited to use of a spindle of this specific type and that it will be possible within the scope of the invention to use a spindle of the type having an offset top portion such as for example as in my copending U.K. application 17387/57 and the corresponding U.S. application Ser. No. 738,478, now Patent No. 3,044,782, the disclosures of which applications are hereby made part of the disclosure of the present application.

The drop control mechanism (FIGURES 26 and 27) which is arranged below the bridge 370 comprises a drop control arm mounted for reciprocable movement as well as for being tilted and is generally designated by reference numeral 600. The front end of the arm, i.e. the end adapted to engage in the recess 609*a* of the member 609 at the lower end of the interior control rod 524 in the center spindle has a notch 606 (FIGURE 26). The structure of the drop control mechanism and its mode of operation will appear from FIGURES 26 and 27. The drop control arm 600 is supported adjacent its right hand end on a flap 620 extending below the bridge 370. This flap has opposite edge slots engaging in an aperture 608 in the arm 600 so as to allow the arm to reciprocate. The arm 600 is further guided by means of an elongated slot 610 and a pin 611 extending below the bridge at its left hand end to secure correct engagement with the notch 606 in the annular groove 609*a*. Between the arm 600 and the bridge 370 a spring 612 is interposed in such position and pulling in such direction that it will normally tend to keep the arm 600 in the retracted and raised position. On the top side of the arm 600 a cam surface 614 is arranged in the form of an inclined plate member the inclination of which preferably can be adjusted by means of a screw 614*a*. To control the movement of the arm 600 a member, generally designated by reference numeral 650, is mounted for reciprocating movement and having a pair of rollers 659 and 661 to be wedged in between the cam surface 614 and the underside of the bridge 370. These rollers are supported on a lower part 656 of the member 650 extending down through a slot 624 in the bridge 370. On the top side of the bridge the member 650 has a portion 652 which slides on the top side of the bridge 370 and on which a roller 655 is mounted operable to be engaged by a cam member 680 forming a third cam portion of the cam disc and having cam sections of different radii.

Neither this part of the mechanism nor its mode of operation will be described in further detail, reference being made to the complete specification accompanying my U.K. patent application 700/56 and the corresponding U.S. application Ser. No. 633,288 the disclosures of which applications are hereby made part of the present disclosure.

The tracks in the surface of the cam disc comprise a recess 398 (FIGURE 22) in which the track follower 336 can swing freely during playing of a record when the cam disc 380 is arrested by means of the gear wheel 308 engaging in the peripheral recess 383 thereof. This recess 398 which in the following will be referred to as the playing recess is at one end confined by a curved wall 398*a* defining an inwardly leading cam portion so that when the cam disc 380 is started after playing of a record the track follower 336 will be engaged by curved wall 398*a* to be swung inwardly whereby the tone arm 14 will also be swung inwardly to a position with the activating member 34, 30 of the trackfinder mechanism inside the periphery of a record of the smallest size to be played. Thus the playing recess 398 narrows at its outlet end where it merges in a short outlet track 398*b*. When the track follower 336 passes in this track the tone arm lifting control mechanism will cause the tone arm 14 to be lifted to its top position with the track finder mechanism activating member 34, 30 engaging the underside of the lowest record supported on the center spindle 11. The track 398*b* continues in an outwardly leading track 389 adjacent the interior end of which there is provided an outlet for the track follower 336 in the form of a ramp 389*a*.

Behind the track 389 seen in the direction of rotation of the cam disc 380 and substantially parallel therewith there is provided another outwardly leading track 393 the interior end of which is located behind the ramp 389*a* so that the track follower 336 when leaving the track 389 by climbing the ramp 389*a* will be deposited in the track 393.

The track 389 continues at its exterior end in a most exterior track 395 following the periphery of the cam disc 380 near the edge thereof and merging at its end in the playing recess 398. The track 393 continues in its exterior end in a track 394 slightly inside the track 395 and substantially concentric with the cam disc 380. The track 394 continues in an inwardly leading track 396 which merges in the playing recess 398. The track 396 widens at its interior end and its exterior wall continues as a surface 397 confining the other end of the playing recess and defining a cam portion capable of cooperating with the track follower 336. The interior end of the inwardly leading track 396 is located at such radial distance from the center of the cam disc 380 that the tone arm 14 will be located in an inwardly swung position with the stylus tip at least vertical above the initial sound track of a record of the smallest size to be handled and preferably with the entire track finder arrangement inside the periphery of a record of that size.

The operation of the tracks in the surface of the cam disc is timed with the operation of the raising control cams in the following manner:

The tone arm 14 is raised to a position with the trackfinder activating member 30, 34 slightly below the underside of the lowest record supported on the center spindle 11 immediately when the cam disc 380 starts to rotate. At the outlet of the playing recess 398 the tone arm 14 is further raised and during the passage of the track follower 336 through the track 398*b* the tone arm 14 is raised so as to be biased against the underside of the lowest record, if any, on the center spindle. This bias is continued during the initial passage of the track follower 336 in the outwardly leading track 389*a*. As soon as the ramp 389 has passed the track follower 336 the tone arm 14 is lowered to a position of its top below the lowest record supported on the center spindle 11. The tone arm is retained in this lower position or may be allowed to be gradually lowered to a position with the track finder arrangement slightly above the top surface of the top record of a stack of records deposited on the turntable until the track follower 336 has arrived at the interior end of the inwardly leading track 396. In this position, i.e. when the track follower is in the widened end of the track 396 the tone arm is lowered to engage its track finder mechanism against the top surface of the record resting on the turntable and remain lowered in this position during the remaining part of the rotation of the cam disc 380.

The mode of operation of the track finder arrangement in combination with the control mechanism as shown and described is as follows, reference here being made to the embodiment of the track finder arrangement as described with reference to FIGURES 14–20.

When after playing of a record the cam disc 380 is started controlled by the trip starter mechanism 437, 410, 436, etc. or the phonograph is started by means of the starter push-button 21, the tone arm 14 is immediately raised. Depending on the position of the track follower 336 latter will be engaged somewhere by the wall 398*a* of the playing recess and be guided inwardly to the entrance of the track 398*b* at the entrance of which, as previously explained, the tone arm is in an interior position with the activating member 274, 30 of the trackfinder mechanism inside the periphery of a record of the smallest size to be played. During the passage of the track follower 336 through the track 398*b* the tone arm 14 will be raised into engagement with the underside of the lowest record supported on the center spindle, if any records. Assuming that the spindle is loaded with a stack of records the friction member 30 provided on top of actuating member 274 will by the engagement with the underside of the record impart a frictional restraint to outward movement of the tone arm 14 when such outward movement is controlled in the initial portion of the track 389. The track follower 336 is thereby caused to leave the track 389 by climbing the ramp 389*a*.

It will be understood that already due to the fact that the tone arm is biased against the underside of the record the operative connection between the tone arm and the record surface is not only causing the frictional restraint against outward travel of the tone arm but also causing depression of the activating member 274 to bring the parts of the trackfinder mechanism to their operative position. The position just described here above is shown in FIGURE 28.

The track follower will then pass the exposed surface part of the cam disc behind the ramp 389*a* and be deposited in the track 393 which will cause outward movement of the track follower and accordingly outward swinging of the tone arm which is lowered out of engagement with the underside of the record. This is the position shown in FIGURE 29.

The tone arm is now free to swing outwardly and when the track follower enters the exterior track 394 in the position shown in FIGURE 30, the cam 680 (FIGURE 27) will by its engagement with the roller 655 move the member 650 in direction to wedge the rollers 659 and 661 inbetween the cam surface 614 and the underside of the bridge 370 so as to thereby operate the control mechanism in the interior of the center spindle whereby the lowest record in the stack will be released and guided along the spindle to assume its playing position on the turntable. This is the position shown in FIGURE 30.

The tone arm is hereafter slightly lowered simultaneously with being swung in under control of the track 396 as illustrated by the position shown in FIGURE 31, in which the tone arm is in engagement with the top side of the record on the turntable and the track follower 336 is in engagement with the cam portion 397 in the beginning of the playing recess 398.

According to an important feature of my invention the inclined position of the supporting roller 240 of my trackfinder mechanism is so adapted to the curved configuration of the cam portion 397 and the velocity of the cam disc 380 that the engagement between the roller 240 of the trackfinder mechanism and the rotating record will cause the tone arm to move outwardly across the surface of the record at a velocity which is sufficient to retain the track follower 336 in engagement with the wall portion 397. In other words, as long as the track follower 336 is retained in such engagement, the velocity at which the tone arm can travel outwards is irrespective of the velocity caused by the operation of the trackfinder roller governed by the velocity of the cam disc. This renders the design of the trackfinder mechanism rather uncritical in comparison with trackfinder arrangements where precautions must be taken not to make the velocity of the outward travel excessive because in such event the stylus will be likely to drop beyond the edge of the record together with the primary roller 240 of the trackfinder. In the present case the velocity could be designed to be relatively large if the trackfinder mechanism were left to itself, but the cam disc 380 causes a retarding action by having the track follower 336 continuously in engagement with the wall portion 397 until the trackfinder in its outward movement arrives at the edge of the record which is the position shown in FIGURE 32.

When in this position the primary trackfinder roller 26 drops beyond the edge of the record and the secondary roller 28 comes into engagement with the surface of the record, this will as previously explained in connection with the structure of the trackfinder impart a frictional restraint to outward movement of the tone arm which therefore will be retained in the position in which the secondary trackfinder roller 28 is adjacent the edge of the record. The cam disc 380, however, continues to rotate which simply moves the end wall 397 of the playing recess out of engagement with the track follower 336. The trackfinder roller 28 will thereby rotate and as explained in connection with the trackfinder arrangement this rotation will pull the tone arm 14 slightly inwardly until the primary roller 26 is in firm engagement with the edge of the record. In this position the design of the trackfinder secures correct positioning of the stylus tip above the groove of the reccord in start-of-play position. When, after the delay caused by rotation of the roller 28, its slot 262*a* (FIGURE 20) aligns with the flap 264 the spring 244 tilts the trackfinder supporting structure 226 upwardly so as to retract the mechanism behind the stylus tip.

Due to the complete disengagement of the track follower 336 from the wall 397 of the control cam 380 already before release of the trackfinder this release is also rendered uncritical.

It will be appreciated that my improved combination of trackfinder mechanism and cycle control mechanism has a plurality of advantages and aspects.

One advantage of my invention is that it avoids the necessity of providing auxiliary clutch means and activating mechanism therefor between the cycling cam and the linkage system associated with the tone arm or in this linkage system itself in order to disengage a forced outwardly controlled movement of the tone arm. The invention provides for immediate and fully automatic engagement between the cycling cam and the linkage system exclusively by the operation of the secondary member of the trackfinder mechanism.

It will be appreciated that my invention provides for a plurality of combinations of novel features and a plurality of aspects of different structural features of the phonograph according to my invention.

Seen from one aspect of my invention the first part of the travel path of the tone arm as controlled by the track 389 is a path leading to the stop position through the track 395. As explained hereinbefore this track merges in the playing recess 398 and as also explained the tone arm will in its most outward position be lowered on the post 13 and thereby actuate the phonograph motor switch 15 to open the latter so as to cause the phonograph to be stopped. In other words if the tone arm is raised without any records being supported on the center spindle such as in the case of after playing of the last record, the tone arm movement will be uninterrupted with the result that the track follower 336 will not be caused to climb the ramp 389*a* so that the tone arm will be swung outwardly under control of the track 389 which will swing the tone arm to its most exterior position in which it will be retained when the track follower 336 passes through the track 395. This will according to the embodiment shown and described lower the tone arm on the post 13 so as to thereby open the switch by gravity action.

It will be appreciated, however, that the utilization of the idle movement of the tone arm without being obstructed by the presence of a record on the center spindle can also cause actuation of a stop control arrangement in other ways such as for example disclosed in my copending U.K. application 30,756/56 referred to hereinabove and the corresponding U.S. application Ser. No. 688,950, now Patent No. 3,017,188.

Seen from another aspect the invention provides a phonograph having a trackfinder arrangement which is rendered operable as a record size feeler arrangement in response to a test operation on a record supported above the turntable and a stop control arrangement which is rendered operative when the test arrangement is inoperative.

Seen from still a further aspect my invention provides a phonograph having a trackfinder arrangement and a cycling cam arrangement for selectively controlling movements of the tone arm to render the trackfinder arrangement operative to feel the size of the next record to be played, or to render stop means for the phonograph effective in which the trackfinder arrangement includes means for simultaneously actuating the trackfinder means to be operable to feel the record size and render the control mechanism operable to move the tone arm to a position in which the trackfinder mechanism is operable to feel the record size.

Seen from the same aspect the invenution further comprises idler running control means for the movement of the tone arm i.e. the track 389 and means operable to select such idler running control means in response to lack of a record on the magazine spindle for thereby causing stop control means to be selected and simultaneously render the trackfinder activating means inoperative.

The invention is not limited to the embodiment of the control mechanism shown and described with reference to the drawing herein.

Thus for example the means for controlling the outward velocity of the tone arm when deposited with the primary supporting member of the trackfinder arrangement in engagement with the surface of a record does not need to be in the form of the primary supporting roller of the trackfinder but can be incorporated in the control mechanism such as indicated in dash lines in FIGURE 22.

In such event the cam portion 397 forms one wall of an outwardly leading track 701 which forms a continuation of the track 396. The interior wall of the track 701 is in the form of an elongated ramp 701*a* from the top of which a ramp 701*b* extends downwardly to the playing recess 398.

In this event the outward movement of the tone arm is entirely controlled by the passage of the track follower 336 in the track 701. In this event the primary supporting member of the trackfinder arrangement does not need to contribute at all to the control of the outward movement of the tone arm and the trackfinder arrangement can in such event be simplified by making the member 26 in the form of a light friction member which has the purpose only to support the tone arm during its outward travel and allow the latter to take place exclusively by the engagement of the track follower 336 in the outwardly leading track 701.

When in such case the secondary trackfinder member 28 engages the surface of the record and causes the outward movement of the tone arm to be interrupted by imparting a frictional restraint to further outward movement of the tone arm, the track follower 336 is caused to climb the ramp 701*a* in order to leave the track 701 whereafter the track follower descends the ramp 701*b* into the playing recess 398. It will be appreciated that in the case of such embodiment there will be a certain resistance necessary to be overcome in order to cause the track follower 336 to climb the ramp 701*a* and that accordingly it will be necessary to design the secondary friction member of the trackfinder arrangement to overcome this resistance. In other words the trackfinder arrangement must be designed to impart a frictional restraint on outward movement of the tone arm by the engagement between the secondary member 28 and the surface of a record which is larger than the outwardly leading force on the tone arm as caused by the engagement of the track follower 336 in the track 701 and sufficient to enable the track follower 336 to yield against its resilient action and climb the ramp 701*a*.

It will further be appreciated that with the velocity of the tone arm outwardly controlled by the velocity of the control mechanism, i.e. the cam disc, it is in order to obtain a constant time interval of the change cycle desirable to drive the cam disc at a constant speed during the change cycle. This can be obtained by driving the cam disc directly from the phonograph motor as commonly known, for example in record changers known on the world market under the trade name Collaro, or according to the copending U.K. application 16090/56 and the corresponding U.S. patent application Ser. No. 660,706, now abandoned, filed May 21, 1957, the disclosures of said applications also being hereby made part of the disclosure of this application.

Though in the foregoing my invention has been described in great detail with reference to a plurality of embodiments it will be understood that my invention is not limited to these specific embodiments and may be modified in various respects within the scope of the appended claims.

I claim:

1. A phonograph apparatus having a tone arm, track finder means, means operatively connecting said track finder means with said tone arm to effectively position the latter by the former, cycle control means including selectively operable means, in effect, disengageably connecting said tone arm with said cycle control means to control, while connected, the movement of said tone arm during a cycle between playing of records, said cycle control means and said track finder means being each operable to provide a velocity control effect and jointly constituting velocity control means operable to control the velocity of the outward movement of said tone arm across the surface of the record with said track finder means in engagement with the record surface and said track finder means including means operable in the position thereof at the edge of said record to oppose said outward movement and to thereby render the velocity control effect of said cycle control means inoperative in response to such opposition by effectively disengaging said cycle control means from said tone arm by means of said selectively operable means.

2. In a phonographic apparatus provided with a tone arm adapted to support thereon stylus means and with trackfinder means having an operative and an inoperative position, the combination comprising actuating means operatively connected with said trackfinder means for rendering said trackfinder means operative, means for supporting a record above the normal playing position thereof, cycling cam means having a plurality of cam portions and operatively connected with said tone arm for swinging said tone arm inwardly and outwardly and eventually to bring said tone arm into a swung-in position for lowering thereof with said trackfinder means in the operative position thereof to thereby provide an operative engagement of said trackfinder means with the surface of the next record to be played, lifting control means operatively connected with said tone arm to raise said tone arm and thereby engage said trackfinder actuating means with a record on said supporting means to operate said trackfinder actuating means by the engagement with said record, and means in said apparatus and operative to oppose swinging movement of said tone arm during said engagement including means operable by said opposition to the swinging movement of said tone arm for rendering said cycling cam means effective to move said tone arm into said swung-in position thereof upon operation of said trackfinder actuating means.

3. A phonographic apparatus having a tone arm and comprising in combination:

track finder means supported on said tone arm including primary means operable to support said tone arm on the surface of a record during outward travel and secondary means operable to engage the surface of the record upon passage of said primary means beyond the edge of said record, said secondary means being operable to impose a frictional restrain against further outward movement of the tone arm in response to engagement with said record surface, control means operable to move said tone arm including a rotatable cam member having cam means, cam engaging means on said tone arm operable to cooperate with said cam means for causing swinging movement of said tone arm including means for effectively disengaging said cam engaging means from said cam member during playing of a record, said cam means including first means operable in response to enggaement with said cam engaging means to render the rotational velocity of said cam member operable to control the outward travel velocity of said tone arm on the surface of said record with the primary means of said track finder arrangement in engagement with the record surface, and means in said phonograph operable to render said disengagement means effective in response to the interruption of the outward swinging movement of the tone arm by said frictional restraint imposed on said tone arm as a result of the engagement of said secondary means with the surface of said record.

4. A phonographic apparatus having a tone arm and comprising in combination:

track finder means supported on said tone arm including primary means operable to support said tone arm on the surface of a record during outward travel and secondary means operable to engage the surface of the record upon passage of said primary means beyond the edge of said record, said secondary means being operable to impose a frictional restraint against further outward movement of the tone arm in response to engagement with said record surface, control means operable to move said tone arm including a rotatable cam member having cam means, cam engaging means on said tone arm operable to cooperate with said cam means for causing swinging movement of said tone arm including means for effectively disengaging said cam engaging means from said cam member during playing of a record, said cam means including first means operable in response to engagement with said cam engaging means to render the rotational velocity of said cam member operable to control the outward travel velocity of said tone arm on the surface of said record with the primary means of said track finder arrangement in engagement with the record surface, including an inclined roller operable as the primary means of said track finder means, the inclination of said roller with respect to the radius through the center of a record being large enough to render said roller operable to swing the tone arm outwardly at a speed to maintain engagement between said cam engaging means and said first means, and means in said phonograph operable to render said disengagement means effective in response to the interruption of the outward swinging movement of the tone arm by said frictional restraint imposed on said tone arm as a result of the engagement of said secondary means with the surface of said record.

5. A phonographic apparatus having a tone arm and comprising in combination:

track finder means supported on said tone arm including primary means operable to support said tone arm on the surface of a record during outward travel and secondary means operable to engage the surface of the record upon passage of said primary means beyond the edge of said record, said secondary means being operable to impose a frictional restaint against further outward movement of the tone arm in response to engagement with said record surface, control means operable to move said tone arm including a rotatable cam member having cam means, cam engaging means on said tone arm operable to cooperate with said cam means for causing swinging movement of said tone arm including means for effectively disengaging said cam engaging means from said cam member during playing of a record, means for maintaining engagement between said cam engaging means and said cam means including first means operable in response to engagement with said cam engaging means to render the rotational velocity of said cam member operable to control the outward travel velocity of said tone arm on the surface of said record with the primary means of said track finder arrangement in engagement with the record surface and track means following the configuration of said first means, said track means being provided with an interior wall in the form of a ramp and said cam engaging means being yieldable to enable climbing thereof of said ramp, and means in said phonograph operable to render said disengagement means effective in response to the interruption of the outward swinging movement of the tone arm by said frictional restraint imposed on said tone arm as a result of the engagement of said secondary means with the surface of said record.

6. In a phonograph having a turntable, drive means operatively connected with said turntable to drive the same including disabling means to effectively disable said drive means, support means for supporting a stack of records spaced from said turntable, means operable to release said records in sequence from said support means to said turntable, a tone arm and a control mechanism operable to move said tone arm through a cycle including a cam member and a cam follower operatively connected with said tone arm, the improvement essentially consisting of said cam member having a plurality of cam means including first cam means for rendering said tone arm operable to play a record supported on said turntable from a start-of-play position thereof, second cam means effectively providing a stop position for said tone arm, and third cam means providing a start-of-control-cycle position for said cam follower effectively establishing a position of said tone arm within the edge orbit of the record of the smallest size to be played, first means in said control mechanism operable to raise the tone arm in said start-of-control-cycle position to engage with a record, if any, supported on said supporting means, second means in said control mechanism operable to selectively guide said cam follower to cooperate with said first cam means in the presence of a record on said supporting means, and third means in said control mechanism to selectively guide said cam follower to cooperate with said second cam means exclusively in the absence of such record on said supporting means.

7. In a phonograph having a turntable, drive means operatively connected with said turntable to drive the same including disabling means to effectively disable said drive means, support means for supporting a stack of records spaced from said turntable, means operable to release said records in sequence from said support means to said turntable, a tone arm and a control mechanism operable to move said tone arm through a cycle including a cam member and a cam follower operatively connected with said tone arm, the improvement essentially consisting of said cam member having a plurality of cam means including first cam means for rendering said tone arm operable to play a record supported on said turntable from a start-of-play position thereof, second cam means including a stop track effectively providing a stop position for said tone arm, and third cam means including a playing track and an outwardly leading track, said third cam means providing a start-of-control-cycle position for said cam follower located at the interior end of an outwardly leading track and effectively establishing a position of said tone arm within the edge orbit of the record of the smallest size to be played, first means in said control mechanism operable to raise the tone arm in said start-of-control-cycle position to engage with a record, if any, supported on said supporting means, said outwardly leading track being provided with a ramp over which said cam follower is adapted to be selectively guided into said playing track, second means in said control mechanism operable to selectively guide said cam follower to cooperate with said first cam means in the presence of a record on said supporting means, and third means in said control mechanism including said outwardly leading track to selectively guide said cam follower into said stop track exclusively in the absence of such record on said supporting means.

8. In a phonograph having a turntable, drive means operatively connected with said turntable to drive the same including disabling means to effectively disable said drive means, support means for supporting a stack of records spaced from said turntable, means operable to release said records in sequence from said support means to said turntable, a tone arm and a control mechanism operable to move said tone arm through a cycle including a cam member and a cam follower operatively connected with said tone arm, the improvement essentially consisting of said cam member having a plurality of cam means including first cam means for rendering said tone arm operable to play a record supported on said turntable from a start-of-play position thereof, second means including a stop track effectively providing a stop position for said tone arm, and third cam means including a playing track and an outwardly leading track, said third cam means providing a start-of-control-cycle position for said cam follower located at the interior end of an outwardly leading track and effectively establishing a position of said tone arm within the edge orbit of the record of the smallest size to be played, said stop track being directly connected to said outwardly leading track, first means in said control mechanism operable to raise the tone arm in said start-of-control-cycle position to engage with a record, if any, supported on said supporting means, said outwardly leading track being provided with a ramp over which said cam follower is adapted to be selectively guided into said playing track, second means in said control mechanism operable to selectively guide said cam follower to cooperate with said first cam means in the presence of a record on said supporting means, and third means in said control mechanism including said outwardly leading track to selectively guide said cam follower into said stop track exclusively in the absence of such record on said supporting means.

9. A phonograph apparatus having a tone arm, track finder means, means operatively connecting said track finder means with said tone arm to effectively position the latter by the former, cycle control means including selectively operable means, in effect, disengageably connecting said tone arm with said cycle control means to control, during engagement, the movement of said tone arm during a cycle between playing of records, said cycle control means and said trackfinder means being each operable to provide a velocity control effect and jointly constituting velocity control means operable to control the velocity of the outward movement of said tone arm across the surface of the record with said trackfinder means in engagement with the record surface, the velocity control effect of said cycle control means overriding the velocity control effect of said track finder means with said selectively operable means operatively connecting said cycle control means with said tone arm, and said trackfinder means including means operable in the position thereof at the edge of said record to oppose said outward movement and to thereby render the velocity control effect of said cycle control means inoperative in response to such opposition by effectively disengaging said cycle control means from said tone arm by means of said selectively operable means.

10. The combination as claimed in claim 2, further comprising stop control means in said apparatus, another plurality of cam portions on said cycling cam means, means operatively connecting said stop control means with said another plurality of cam portions to thereby render said stop control means effective by said another plurality of cam portions, and means operatively connected with said cycling cam means for alternatively rendering said another plurality of cam portions operable in the absence of a record on said support means and for rendering said first-mentioned plurality of cam portions operable to swing said tone arm in the presence of a record on said support means.

11. In a phonographic apparatus having a tone arm adapted to carry stylus means, cycling control means movable between playing of records, linkage means operatively connecting said tone arm with said cycling control means for moving said tone arm through a control cycle between playing of two records to be automatically played one after the other to thereby enable eventual lowering of said tone arm on a record supported in position to be played next, said cycle control means and said linkage means being operatively associated with each other to effectively constitute disengaging means operable to effectively and selectively disengage said linkage means from said cycling control means, means operable to enable said linkage means to idle during playing of a record, and trackfinder means operatively connected with said tone arm and operable to feel the size of the next record to be played with said tone arm lowered to engage the surface of the record to be played next, said trackfinder means including a member operable to interrupt the swinging movement of said tone arm, and said disengaging means being rendered effective in response to said interruption to disengage said linkage means from said cycling control means.

12. The combination as claimed in claim 11, wherein said control means includes a first track arrangement for controlling the movement of said tone arm through said control cycle and a second track arrangement for alternately moving said tone arm through at least a portion of said control cycle, stop means, means operatively connected with said stop means to render said stop means operable by said second track arrangement, means for supporting a record above the normal playing position thereof, and selecting means in said apparatus for effectively selecting said first track arrangement in the presence of a record on said support means and for effectively selecting said second track arrangement in the absence of said record.

13. The combination as claimed in claim 12, further comprising actuating means operatively connected with said trackfinder means for rendering said trackfinder means operative to feel the size of the record to be played next including means for rendering said actuating means effective by said selecting means.

14. The combination as claimed in claim 13, wherein said selecting means includes a member supported on one of said tone arm and said actuating means and having a portion extending above the top of said tone arm operable to engage the underside of the record supported on said support means.

15. The combination as claimed in claim 14, further comprising lift control means operatively connected with said tone arm for raising said tone arm and thereby bias the same with said selecting member engaging the underside of the record supported on said support means.

16. The combination as claimed in claim 15, wherein said selecting means includes means operable to impose a frictional restraint against swinging movement of said tone arm by engagement of said member against the underside of said last-mentioned record, and wherein said cycling control means includes a cam portion operatively connected with said tone arm to swing the same while in the raised position thereof biased by said lift control means against the underside of said last-mentioned record.

17. In a phonographic apparatus having a tone arm with a stylus, the combination of cycling cam means operatively connected with said tone arm for controlling movement thereof from an end-of-play position to an interior position where said tone arm is adapted to be deposited on the surface of the next record to be played, trackfinder means operatively connected with said tone arm for supporting said tone arm with its stylus spaced from the surface of said next record upon being deposited on the record surface in said interior position, lever means operatively connected with said tone arm for moving the same in response to movement of said cycling cam means, means operable to move said tone arm outwardly towards the edge of said record upon engagement of said trackfinder means with said record, on the one hand, and of said lever means with said cam means, on the other, and means for effectively disabling the operative connection between said lever means and said cycling cam means, said trackfinder means including means operable to temporarily support and oppose outward travel of said tone arm at the edge of said record, and means operable by the opposition of said last-mentioned means against outward travel to render said disabling means effective.

18. A record-changing apparatus having a tone arm provided with stylus means, a tone arm movement control mechanism including rotary cycling cam means provided with a playing recess and a plurality of tracks and track follower means associated with said tone arm and freely movable with the track follower thereof in said playing recess during playing of a record and adapted to follow any one of said plurality of tracks in said cycling cam means, said cycling cam means including one track system adapted to move said track follower through a path terminating in said playing recess, the last position of said path being effectively formed by a wall portion of said playing recess, trackfinder means operatively connected with said tone arm and adapted to feel the size of the record supported in its playing position and thereby to deposit said stylus means in the initial sound groove after having been moved across the surface of the record towards the edge thereof including auxiliary means on said trackfinder means for imparting a frictional restraint against further outward movement of said tone arm, said trackfinder means and said control means so cooperating with each other that the velocity of the outward movement of said tone arm in relation to the rotational speed of said cycling cam means keeps said track follower in engagement with said wall of said playing recess, and the frictional restraint between said auxiliary means and the surface of the record effectively disengaging said track follower from said playing recess wall.

19. An apparatus as claimed in claim 18, further comprising stop means for said apparatus, said cam means including a second track system operable to render said stop means effective, and selector means operatively connected with said apparatus for selecting said second track system in the absence of a record to be supplied to the playing position.

20. An apparatus as claimed in claim 19, wherein said plurality of tracks include an initially outwardly leading cycling cam portion and wherein said second track system includes an initially outwardly leading stop control cam portion, both of said initial cam portions being arranged in substantially parallel relationship and said stop control cam portion preceding said cycling control cam portion in the direction of rotation of said cam means, said track follower means being adapted to cooperate with both of said cam portions, said initial stop control cam portion having a ramp, and means operable to enable said track follower means to climb said ramp and thereby to be effectively disengaged from said stop control track system in response to the operation of said selector means.

21. In a phonograph having a turntable, a tone arm including stylus means and trackfinder means including primary means operable to gauge the size of the record by supporting the tone arm with the stylus means spaced above the surface of a record during outward movement of said tone arm and to be released adjacent the edge of the record for thereafter depositing the tip of said stylus means in the sound groove with said tone arm in start-of-play position, the combination with said primary means of secondary means operatively connected with said tone arm to oppose outward movement thereof when said primary means has passed the edge of the record, driven control means operatively connected with said tone arm to control the movement of said tone arm during a cycle thereof through a path effectively swinging said tone arm inwardly from an exterior position thereof to be lowered and supported on a record on said turntable with said trackfinder means operative to gauge the size of the record and thereby enable depositing the stylus tip in the start-of-play position thereof, drive means for positively moving said driven means including means for effectively disengaging said driven means from said drive means to thereby enable said tone arm to swing freely during playing of a record with the stylus tip following the sound grooves thereof, and means operatively connected with said disengaging means for rendering said disengagement means effective upon opposition to said outward movement of said tone arm by the operation of said secondary means.

22. In a phonograph having a support for a record during playing thereof, a tone arm having stylus means and trackfinder means provided with first means operable to support and carry the tone arm with the stylus means thereof spaced above the surface of a record resting on said support and adapted to be released adjacent the edge of said record so as to enable depositing of the tip of said tone arm stylus means in the sound groove with the tone arm in start-of-play position, in combination with said trackfinder means provided with said first means of second means operable to engage the record to oppose outward movement of the tone arm when said first trackfinder means has passed the edge of the record, drive means operatively connected with said tone arm for positively moving said tone arm through a predetermined path before playing of a record including driven means between said tone arm and said drive means, means for rendering said drive means and said driven means effective to swing said tone arm through a cycle terminating with an inwardly swinging movement thereof to be lowered on the record resting on said support with said first trackfinder means operative, means operatively connected with at least one of said drive and driven means for effectively disengaging said drive means and said driven means to thereby enable said tone arm to swing freely during playing of a record with the stylus tip following the sound grooves thereof, and means operatively connected with said disengaging means for rendering said disengagement means effective in response to opposition to said outward movement of said tone arm by the operation of said second trackfinder means.

23. In a phonographic apparatus having means for supporting a record in playing position thereof, the combination comprising a tone arm having stylus means and trackfinder means operable to feel the size of a record to be played and adapted to deposit said tone arm stylus means in the initial sound groove of said record, cycle control means operatively connected with said tone arm including drive means and driven means operable to swing said tone arm through a cycle to eventually bring said tone arm into a swung-in position, means in said cycle control means for lowering said tone arm on the record in said swung-in position to thereby deposit said tone arm supported on the record by said trackfinder means and thereby enable outward swinging movement of the tone arm to the start-of-play position thereof in which said stylus means engages the initial sound groove of the record, and means in said cycle control means and operative to effectively disengage said drive means and said driven means in dependence on the feeling operation of said trackfinder means to feel the size of the record to be played.

24. In a record-changing phonograph having a trackfinder arrangement operable to support the tone arm of the phonograph on the top surface of a rotating record and to guide the stylus tip of the tone arm to engage the sound track of a record in start-of-play position, the combination with the tone arm, comprising a trackfinder arrangement operatively connected with said tone arm including a first member operable to support the tone arm with the stylus tip spaced above the surface of the record, a second member arranged in trailing relationship with respect to said first member, means operatively connected with both said members for providing for said members an operative position with both members disposed below said stylus tip and an inoperative position with both members retracted behind said stylus tip including latching means operable to latch said trackfinder arrangement with said members in the operative position thereof and unlatching means operable to unlatch said trackfinder arrangement with said members in the inoperative position thereof, spring means normally urging said members to the inoperative position thereof upon being unlatched, means operatively connected with said unlatching means to operate the same in response to engagement between said second trackfinder member and the surface of a record, control means operatively connected with said tone arm for controlling movement of said tone arm with said trackfinder members in the operative position thereof in engagement with the top surface of a record to be played, means operatively connected with said latching means and adapted to latch said trackfinder arrangement in the operative position thereof during the cycle of operation controlled by said control means, means in said phonograph operative in response to engagement between said second trackfinder member and said record surface for imparting a frictional restraint against outward movement of said tone arm, and means operatively connected with said control means and operative in dependence on said frictional restraint for rendering said control means effectively inoperative to control further movement of said tone arm after engagement between said second trackfinder member and the record surface.

25. In a record-changing phonograph having a trackfinder arrangement operable to support the tone arm of the phonograph on the top surface of a rotating record and to guide the stylus tip of the tone arm to engage the sound track of a record in the start-of-play position, the combination with said tone arm comprising a trackfinder arrangement including a first member operable to support the tone arm with the stylus tip spaced above the surface of the record and a second member arranged in trailing relationship with respect to said first member, means operatively connected with said members to provide for said members an operative position with both members disposed below the stylus tip and an inoperative position with both members retracted behind the stylus tip including latch means operable to latch said trackfinder arrangement with said members in the operative position thereof and unlatching means operable to unlatch said trackfinder arrangement, means in said trackfinder arrangement urging said members to the inoperative position thereof when unlatched, means operatively connected with said unlatching means for rendering the same effective in response to engagement between said second trackfinder member and the surface of a record, a control means operatively connected with said tone arm for controlling movement of said tone arm through a cycle, means in said phonograph and operative in response to engagement between said second trackfinder member and said record surface for imparting a frictional restraint against outward movement of the tone arm, and means operatively connected with said control means for rendering said control means effectively inoperative by said frictional restraint to control the movement of said tone arm after engagement between said trackfinder arrangement and the record surface.

26. In a phonograph having a turntable, a tone arm including stylus means and trackfinder means operatively connected with said tone arm and provided with testing means operable to test the size of the next record to be played and to be rendered ineffective at the edge of the record for depositing the tone arm stylus tip in the sound groove with the tone arm in start-of-play position, the combination with said trackfinder means of a trackfinder member operable to oppose outward movement of the tone arm, cycle control means operatively connected with said tone arm and operative between playing of a record including means operable to swing said tone arm through a path including swinging the tone arm inwardly to be lowered on the record with the trackfinder means operative to feel the size of the record, said cycle control means including drive means and driven means adapted to engage with said drive means for positively moving said driven means, disengaging means in said cycle control means operative to effectively disengage said drive means from said driven means to thereby enable said tone arm to swing freely during playing of a record, and means operatively connected with said disengaging means for rendering said disengagement means effective in response to opposition against outward movement of the tone arm by the operation of said trackfinder member in engagement with the record surface.

27. In a record-changing phonograph having a tone arm including trackfinder means operable to feel the size of the next record to be played and to be released at the edge of the record for depositing the tone arm stylus in the initial sound groove of the record, in combination with a turntable for supporting the records during playing of the top sides thereof and with support means for a stack of records vertically spaced from said turntable, comprising release means in said phonograph for releasing the records one by one to be dropped onto said turntable, change cycle control means operatively connected with said tone arm to swing said tone arm inwardly and outwardly including raising means for raising and lowering said tone arm, actuating means for rendering said trackfinder means operable to support the tone arm on the record surface, and stop control means for said change cycle phonograph, said control means including cam portions operable to swing said tone arm outwardly to enable dropping of the lowest record in said stack and then to swing said tone arm inwardly to deposit said tone arm with said trackfinder means engaging the top surface of the record resting on said turntable, said raising control means having a cam portion operatively timed with the operation of a portion of said swinging control cam portions for producing engagement of said trackfinder actuating means against the underside of a record supported above the turntable, means in said change cycle control means and operative for effectively selecting said cam portions in dependence on said last-mentioned engagement, and means in said change cycle control means for rendering said stop control means effective to control stoppage of said record in dependence on idling movement of said tone arm in the absence of an engagement of said trackfinder actuating means against the underside of a record supported above the turntable.

28. In a phonographic apparatus having means for supporting a record in the playing position thereof, the combination comprising a tone arm having stylus means and trackfinder means operable to feel the size of a record to be played and adapted to deposit said tone arm stylus means in the initial sound groove of said record, cycle control means operatively connected with said tone arm including drive means and driven means operable to swing said tone arm through a cycle to eventually bring said tone arm into a swung-in position, said drive means including a cycling cam having a plurality of tracks and a recess, said driven means including a track follower operable to be guided through said tracks to thereby cause swinging movement of said tone arm, means in said cycling control means for arresting said cycling cam in a position enabling free movement of said track follower during playing of a record, said recess being defined in part by a cam surface, means in said cycle control means for lowering said tone arm on the record in said swung-in position to thereby deposit said tone arm supported on the record by said trackfinder means, and means in said cycle control means and operative to effectively disengage said drive means and said driven means in dependence on the operation of said trackfinder means, said last-mentioned means being constituted in part by said trackfinder means which includes first means operatively connected with said tone arm for effecting outward movement of said tone arm by engagement of said first trackfinder means with the surface of a rotating record at a velocity assuring engagement of said track follower with said cam surface whereby the outward velocity of the tone arm is governed by the movement of said cycling cam and second means operatively connected with said tone arm and adapted to produce a frictional restraint against said outward movement of said tone arm whereby said track follower is prevented from swinging outwardly and is effectively relieved from the control effect exerted thereon by said cam surface.

29. In a phonographic apparatus having means for supporting a record in the playing position thereof, the combination comprising a tone arm having stylus means and trackfinder means operable to feel the size of a record to be played and adapted to deposit said tone arm stylus means in the initial sound groove of said record, cycle control means operatively connected with said tone arm including drive means and driven means operable to swing said tone arm through a cycle to eventually bring said tone arm into a swung-in position, said drive means including a cycling cam having a plurality of tracks and a recess, said driven means including a track follower operatively connected with said tone arm and guided in said tracks to thereby control the swinging movement of said tone arm, means in said cycling control means for arresting said cycling cam during playing of a record in a position enabling said track follower to swing freely in said recess, said plurality of tracks including an outwardly leading track communicating with said recess by way of a ramp, means in said cycle control means for enabling said track follower to leave said one track by climbing said ramp, means in said cycle control means for lowering said tone arm on the record in said swung-in position to thereby deposit said tone arm supported on the record by said trackfinder means, and means in said cycle control means and operative to effectively disengage said drive means and said driven means in dependence on the operation of said trackfinder means, said trackfinder means including first means operatively connected with said tone arm for supporting the same with its stylus tip spaced from the record surface during outward movement of said tone arm as controlled by said one track, and second means in said trackfinder means adapted to engage the record surface when said first means drops beyond the edge thereof and operative in response to engagement thereof with the record surface to impart a frictional restraint against said outward movement of said tone arm sufficient to cause said track follower to climb said ramp and thereby leave said outwardly leading track and enter said recess whereby said track follower is effectively disengaged from said cycling cam.

30. In a phonographic apparatus provided with a tone arm adapted to support thereon stylus means and with trackfinder means having an operative and an inoperative position, the combination comprising actuating means operatively connected with said trackfinder means for rendering said trackfinder means operative, cycling cam means having a plurality of cam portions adapted to selectively control the operation of said phonographic apparatus in the presence or absence of another record to be played, said cycling cam means being operatively connected with said tone arm for swinging said tone arm inwardly and outwardly and eventually to bring said tone arm into a swung-in position for lowering the tone arm with said trackfinder means in the operative position thereof or for effectively stopping said phonographic apparatus in the absence of such next record, means for operating said trackfinder actuating means to determine the presence or absence of another record to be played, and selecting means operable to select one or the other of said cam portions in dependence on the operation of said last-mentioned means.

31. A phonographic apparatus having a control mechanism for moving the tone arm through a cycle to deposit the tone arm on the top surface of a record supported in the playing position including a trackfinder mechanism on said tone arm and having means operable at the edge orbit of the record to complete feeling of the size of a record, said trackfinder mechanism including a primary member adapted to support the tone arm on the top surface of a record, a secondary member trailing behind said primary member in a plane slightly above the primary member and adapted to engage the surface of the record when the primary member passes beyond the edge thereof, said secondary trackfinder member being operable in response to its engagement with the record surface to provide a frictional restraint against further outward movement of the tone arm, means for latching said trackfinder mechanism in an operative position below the stylus tip of the tone arm, means for unlatching said trackfinder mechanism to assume an inoperative position above said stylus tip, control means operable to govern the outward speed of the tone arm towards the edge of the record including a rotatable cam member having a recess and a member operatively connected with said tone arm including a track-follower capable of moving freely in said recess during the playing of a record, means operable to retain said track follower in engagement with a cam portion of said cam member during the outward travel of the tone arm, and means operable to bring said cam follower out of engagement with said cam portion and into said recess in response to said frictional restraint caused by the engagement between said secondary trackfinder member and the record surface.

32. A phonographic apparatus having a control mechanism for moving the tone arm through a cycle to deposit the tone arm on the top surface of a record supported in the playing position including a trackfinder mechanism on said tone arm and having means operable at the edge orbit of the record to complete feeling of the size of a record, said trackfinder mechanism including a primary member adapted to support the tone arm on the top surface of a record, a secondary member trailing behind said primary member in a plane slightly above the primary member and adapted to engage the surface of the record when the primary member passes beyond the edge thereof, said secondary trackfinder member being operable in response to its engagement with the record surface to provide a frictional restraint against further outward movement of the tone arm, means for latching said trackfinder mechanism in an operative position below the stylus tip of the tone arm, means for unlatching said trackfinder mechanism to assume an inoperative position above said stylus tip, control means operable to govern the outward speed of the tone arm towards the edge of the record including a rotatable cam member having a recess and a member associated with the tone arm including a track follower capable of moving freely in said recess during the playing of a record, means operable to retain said track follower in engagement with a cam portion of said cam member during the outward travel of the tone arm, means operable to bring said cam follower out of engagement with said cam portion and into said recess in response to said frictional restraint caused by the engagement between said secondary trackfinder member and the record surface, stop means operable to stop the phonograph, and means operable to render said stop means effective when said trackfinder mechanism is inoperative.

33. A phonographic apparatus having means for supporting records above the playing position and to be delivered in sequence therefrom to the playing position, a control mechanism for moving the tone arm through a cycle to deposit the tone arm on the top surface of a record supported in the playing position including a trackfinder mechanism on said tone arm and having means operable at the edge orbit of the record to complete feeling of the size of a record, said trackfinder mechanism including a primary member adapted to support the tone arm on the top surface of a record, a secondary member trailing behind said primary member in a plane slightly above the primary member and adapted to engage the surface of the record when the primary member passes beyond the edge thereof, said secondary trackfinder member being operable in response to its engagement with the record surface to provide a frictional restraint against further outward movement of the tone arm, means for latching said trackfinder mechanism in an operative position below the stylus tip of the tone arm, means for unlatching said trackfinder mechanism to assume an inoperative position above said stylus tip, control means operable to govern the outward speed of the tone arm towards the edge of the record including a rotatable cam member having a recess and a member associated with the tone arm including a track follower capable of moving freely in said recess during the playing of a record, means operable to retain said track follower in engagement with a cam portion of said cam member during the outward travel of the tone arm, means operable to bring said cam follower out of engagement with said cam portion and into said recess in response to said frictional restraint caused by the engagement between said secondary trackfinder member and the record surface, means for rendering said trackfinder mechanism operative in response to the presence of a record on said supporting means, and means for rendering said trackfinder mechanism inoperative in the absence of a record on said supporting means.

34. A phonographic apparatus having a control mechanism for moving the tone arm through a cycle to deposit the tone arm on the top surface of a record supported in the playing position including a trackfinder mechanism on said tone arm and having means operable at the edge orbit of the record to complete feeling of the size of a record, stop means operable to stop the phonograph, said trackfinder mechanism including a primary member adapted to support the tone arm on the top surface of a record, a secondary member trailing behind said primary member in a plane slightly above the primary member and adapted to engage the surface of the record when the primary member passes beyond the edge thereof, said secondary trackfinder member being operable in response to its engagement with the record surface to provide a frictional restraint against further outward movement of the tone arm, means for latching said trackfinder mechanism in an operative position below the stylus tip of the tone arm, means for unlatching said trackfinder mechanism to assume an inoperative position above said stylus tip, control means operable to govern the outward speed of the tone arm towards the edge of the record including a rotatable cam member having a recess, first track means for controlling the movement of said tone arm through a cycle which renders said trackfinder mechanism operable, second track means for moving said tone arm through a cycle which renders said stop means operable and a member associated with the tone arm including a track-follower capable of moving freely in said recess during the playing of a record, means operable to retain said track follower in engagement with a cam portion of said cam member during the outward travel of the tone arm, means operable to bring said cam follower out of engagement with said cam portion and into said recess in response to said frictional restraint caused by the engagement between said secondary trackfinder member and the record surface, and selector means operable to select said first track means in response to the presence of a record to be supplied to the playing position and operable to select said second track means in the absence of such record.

35. A phonographic apparatus having a tone arm including a trackfinder mechanism comprising a primary member adapted to support the tone arm on the top surface of a record, a secondary member trailing behind said primary member in a plane slightly above the primary member and adapted to engage the surface of the record when the primary member passes beyond the edge thereof, means for latching said trackfinder mechanism in an operative position below the stylus tip of the tone arm, means for unlatching said trackfinder mechanism to assume an inoperative position above said stylus tip, a control mechanism operable to govern the outward speed of the tone arm towards the edge of the record including a rotatable cam member having a recess and a member associated with the tone arm including a track follower moving freely in the recess during the playing of a record, means operable to retain said track follower in engagement with a cam portion of said cam member during the outward travel of the tone arm, and means operable to bring said cam follower out of engagement with said cam portion and into said recess in response to the frictional engagement between the secondary trackfinder member and the record surface.

36. A phonographic apparatus as claimed in claim 35, in which the cam portion of said cam member is a wall of said recess and the primary trackfinder member is in the form of a roller rotating in response to engagement with the surface of a record and arranged at such an angle relatively to the radius through the record center and the point of engagement with the record surface that the outward velocity of the tone arm as governed by the engagement between the primary trackfinder roller and the record surface retains the track follower in engagement with the wall of the recess defining said cam portion until the frictional restraint caused by engagement between the secondary trackfinder member and the record surface opposes further outward movement of the tone arm and results in disengagement between the track follower and the wall of said recess.

37. A phonographic apparatus as claimed in claim 35, in which the means for retaining said track follower member in engagement with the cam portion specified is in the form of a track following the cam portion, the track communicating with the playing recess by way of a ramp, the track follower being resilient relatively to the plane of the cam member so as to enable the track follower to climb the ramp and enter the playing recess in response to the frictional restraint against outward movement of the tone arm as caused by the engagement of the secondary trackfinder member and the surface of the record.

38. In a record changing phonograph having a turntable and a tone arm adapted to carry stylus means, a cycle control mechanism for controlling the swinging movements of said tone arm between playing of records including cam means having two groups of track portions, track follower means adapted to selectively engage one or the other group of said track portions, means operatively connecting said track follower means with said tone arm to control the swinging movements of the latter by engagement of said track follower means with said cam means, trackfinder means adapted to engage the top surface of the next record to be played while on said turntable and operatively connected with said tone arm to position the same with said stylus means in the start-of-play position thereof, means on said tone arm for testing for the presence or absence of another record to be played during the swinging movements of said tone arm, and means for selecting one or the other group of said track portions in dependence on the presence or absence of another record to be played on said support means.

39. In a record changing phonograph having a turntable and a tone arm adapted to carry stylus means, a cycle control mechanism for controlling the swinging movements of said tone arm between playing of records including cam means, track follower means adapted to engage said cam means and operatively connecting said track follower means with said tone arm to control the swinging movements of the latter by engagement of said track follower means with said cam means, trackfinder means adapted to engage the top surface of the next record to be played while on said turntable and operatively connected with said tone arm to position the same with said stylus means in the start-of-play position thereof, said track follower means including first means for producing an outward movement of said tone arm upon engagement thereof with the top surface of a rotating record supported on said turntable and second means for opposing outward movement upon engagement thereof with the rotating record surface after said first means has dropped beyond the edge of said record, said cycle control mechanism including means for affecting the outward movement of said tone arm, and said last-mentioned means being so arranged and constructed as to effect disengagement between said cam means and said track follower means upon opposition to outward movement of said tone arm by the second means in said trackfinder means.

40. In a record changing phonograph having a turntable and a tone arm adapted to support thereon stylus means, a cycle control mechanism for controlling the swinging movements of said tone arm between playing of records including cam means having two groups of track portions, track follower means adapted to selectively engage one or the other group of said track portions, means disengageably and operatively connecting said track follower means with said tone arm to control the swinging movements of the latter by engagement of said track follower means with said cam means, support means for supporting a record in spaced relationship from said turntable prior to release thereof to said turntable, trackfinder means adapted to engage the top surface of the next record to be played while on said turntable and operatively connected with said tone arm to position the same with said stylus means in the start-of-play position thereof, actuating means for actuating said trackfinder means, means forming part of the actuating means and located on said tone arm for testing for the presence or absence of another record to be played while on said support means during the swinging movements of said tone arm, means for selecting one or the other group of said track portions in dependence on the presence or absence of another record to be played on said support means, said track follower means including first means for producing an outward movement of said tone arm upon engagement of said first means with a rotating record supported on said turntable and second means for opposing outward movement upon engagement thereof with the rotating record surface after said first means has dropped beyond the edge of said record, said cycle control mechanism including means for controlling the outward movement of said tone arm as caused by said first means, and said last-mentioned means being so arranged and constructed as to effect disengagement between said cam means and said track follower means upon opposition to outward movement of said tone arm by the second means in said trackfinder means.

41. In a record changing phonograph having a turntable and a tone arm adapted to support thereon stylus means, a cycle control mechanism for controlling the swinging movements of said tone arm between playing of records including cam means, track follower means adapted to engage with said cam means, means disengageably and operatively connecting said track follower means with said tone arm to control the swinging movements of the latter by engagement of said track follower means with said cam means, trackfinder means adapted to engage the top surface of the next record to be played while on said turntable and operatively connected with said tone arm to position the same with said stylus means in the start-of-play position thereof, said track follower means including first means enabling an outward movement of said tone arm upon engagement thereof with the surface of a rotating record supported on said turntable and second mens for opposing outward movement of said tone arm upon engagement thereof with the rotating record surface after said first means has dropped beyond the edge of said record, said cycle control mechanism including means for effectively controlling the outward movement of said tone arm while said first means engages said record surface and being operative to become ineffectual upon the occurrence of said opposition to outward movement by said second means to thereby effect disengagement between said cam means and said track follower means.

References Cited in the file of this patent

UNITED STATES PATENTS

| | | |
|---|---|---|
| 2,426,978 | Alexandersson | Sept. 9, 1947 |
| 2,504,596 | Scriven et al. | Apr. 18, 1950 |
| 2,637,558 | Fisher | May 5, 1953 |
| 2,818,263 | Dale | Dec. 31, 1957 |